(12) United States Patent
Xu et al.

(10) Patent No.: US 12,035,324 B2
(45) Date of Patent: Jul. 9, 2024

(54) DATA SENDING METHOD, DATA SENDING APPARATUS, AND TERMINAL DEVICE UTILIZING A CONFIGURED GRANT RESOURCE

(71) Applicant: Huawei Technologies Co., Ltd., Shenzhen (CN)

(72) Inventors: Xiaoying Xu, Shanghai (CN); Qufang Huang, Shenzhen (CN); Chong Lou, Shanghai (CN); Qinghai Zeng, Shanghai (CN); Tao Cai, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 521 days.

(21) Appl. No.: 17/315,082

(22) Filed: May 7, 2021

(65) Prior Publication Data

US 2021/0266954 A1   Aug. 26, 2021

Related U.S. Application Data

(63) Continuation of application No. PCT/CN2019/116436, filed on Nov. 8, 2019.

(30) Foreign Application Priority Data

Nov. 9, 2018 (CN) .......................... 201811333411.7

(51) Int. Cl.
*H04W 72/23* (2023.01)
*H04L 1/1607* (2023.01)
(Continued)

(52) U.S. Cl.
CPC .......... *H04W 72/23* (2023.01); *H04L 1/1678* (2013.01); *H04L 1/1812* (2013.01); *H04W 72/1268* (2013.01); *H04W 72/56* (2023.01)

(58) Field of Classification Search
CPC . H04W 72/23; H04W 72/1268; H04W 72/56; H04L 1/1678; H04L 1/1812;
(Continued)

(56) References Cited

U.S. PATENT DOCUMENTS

2018/0368107 A1* 12/2018 Babaei ................ H04W 76/00
2018/0368175 A1* 12/2018 Jeon ...................... H04W 72/04
(Continued)

FOREIGN PATENT DOCUMENTS

CN       104380646 A      2/2015
CN       108347314 A      7/2018
(Continued)

OTHER PUBLICATIONS

Oppo, "Discussion on behaviour of ConfiguredGrantTimer", 3GPP TSG-RAN2 Meeting AH#1, R2-1800155, Jan. 22-26, 2018, 5 pages, Vancouver, Canada.
(Continued)

*Primary Examiner* — Tejis Daya
(74) *Attorney, Agent, or Firm* — Slater Matsil, LLP

(57) ABSTRACT

This application provides a data sending method, a data sending apparatus, and a terminal device, to improve utilization of a configured grant resource. The method includes: A terminal device receives a configuration message from a network device. The configuration message is used to indicate a configured grant, and the configuration message includes information about a timer corresponding to the configured grant. The terminal device determines that the configured grant is used for a HARQ process, and starts the timer for the HARQ process. To-be-sent data in the HARQ process is data on a first logical channel. During running of the timer, when there is to-be-newly-transmitted data on a second logical channel, the timer stops running, or a running
(Continued)

state of the timer is ignored. The data on the second logical channel is sent by using the configured grant.

20 Claims, 7 Drawing Sheets

(51) Int. Cl.
*H04L 1/1812* (2023.01)
*H04W 72/1268* (2023.01)
*H04W 72/56* (2023.01)

(58) Field of Classification Search
CPC ..... H04L 1/1835; H04L 1/1864; H04L 1/188; H04L 1/1896; H04L 1/1822; H04L 1/1829; H04L 1/1848; H04L 1/1867
See application file for complete search history.

(56) References Cited

U.S. PATENT DOCUMENTS

| | | | |
|---|---|---|---|
| 2019/0037550 A1* | 1/2019 | Zhang | H04L 5/0044 |
| 2019/0068334 A1* | 2/2019 | Stern-Berkowitz | H04L 1/1845 |
| 2019/0349932 A1 | 11/2019 | Yu et al. | |
| 2019/0349961 A1* | 11/2019 | Xu | H04W 72/569 |
| 2021/0212107 A1* | 7/2021 | Lu | H04W 72/569 |
| 2021/0243784 A1* | 8/2021 | Goto | H04W 72/21 |
| 2023/0120065 A1* | 4/2023 | Kim | H04W 74/0833 370/329 |

FOREIGN PATENT DOCUMENTS

| | | |
|---|---|---|
| CN | 108366430 A | 8/2018 |
| EP | 2936697 B1 | 10/2018 |
| WO | 2013189391 A2 | 12/2013 |
| WO | 2018008927 A1 | 1/2018 |

OTHER PUBLICATIONS

3GPP TS 38.321 V15.3.0, 3rd Generation Partnership Project; Technical Specification Group Radio Access Network, NR, Medium Access Control (MAC) protocol specification (Release 15), Sep. 2018, 76 pages.
Sony, "UL Intra-UE Pre-emption and Resource conflicts", 3GPP TSG-RAN WG2 Meeting #104, R2-1817076, Nov. 12-16, 2018, 3 pages, Spokane, USA.
Institute for Information Industry (III), "Discussion on Configured Grant Enhancements", 3GPP TSG RAN WG1 Meeting #94bis, R1-1811552, Oct. 8-12, 2018, 4 pages, Chengdu, China.
Oppo, "Clarification on the configured grant and downlink assignment delivery", 3GPP TSG-RAN WG2 Meeting #103bis, R2-1813594, Oct. 8-12, 2018, 3 pages.
3GPP TS 38.211 V15.3.0, 3rd Generation Partnership Project, Technical Specification Group Radio Access Network, NR, Physical channels and modulation (Release 15), Sep. 2018, 96 pages.
Nokia et al., "Prioritization between dynamic grant and configured grant", 3GPP TSG-RAN WG2 NR Ad hoc 1801, R2-1800586, Jan. 22-26, 3 pages.
3GPP TS 38.214 V15.3.0, 3rd Generation Partnership Project, Technical Specification Group Radio Access Network, NR, Physical layer procedures for data (Release 15), Sep. 2018, 96 pages.

* cited by examiner

DATA SENDING METHOD, DATA SENDING APPARATUS, AND TERMINAL DEVICE UTILIZING A CONFIGURED GRANT RESOURCE

CROSS-REFERENCE TO RELATED APPLICATIONS

This application is a continuation of International Application No. PCT/CN2019/116436, filed on Nov. 8, 2019, which claims priority to Chinese Patent Application No. 201811333411.7, filed on Nov. 9, 2018. The disclosures of the aforementioned applications are hereby incorporated by reference in their entireties.

TECHNICAL FIELD

This application relates to the communications field, and more specifically, to a data sending method, a data sending apparatus, and a terminal device.

BACKGROUND

In some communications systems, for example, a new radio (NR) access technology of a 5th generation (5G) communications system, a plurality of services such as ultra-reliable low-latency communication (URLLC) and enhanced mobile broadband (eMBB) may be supported. In addition, there may be communication requirements of a plurality of services in a terminal device (UE). For example, a vehicle may have URLLC data related to self driving that has an emergent latency requirement, or may have multimedia eMBB data such as a live video.

The terminal device may send data by using a dynamically scheduled resource or a configured grant resource. It is assumed that when the terminal device needs to send one type of data, a network device dynamically schedules a resource used to transmit the data. If a hybrid automatic repeat request (HARQ) process number (HPN) of the resource used to transmit the data is the same as an HPN of the configured grant resource, the terminal device starts a configured grant timer corresponding to the HPN. During running of the configured grant timer, the terminal device cannot send the data by using a configured grant corresponding to a HARQ process. It may be understood that only when the configured grant timer is not run, a media access control (MAC) entity of the terminal device allows sending, to a HARQ entity of the terminal device, the configured grant corresponding to the HARQ process and the HARQ process number associated with the configured grant.

It can be learned that, the configured grant resource is not fully utilized in the conventional technology.

SUMMARY

This application provides a data sending method, a data sending apparatus, and a terminal device, to improve utilization of a configured grant resource.

According to a first aspect, a data sending method is provided. The method may be performed by a terminal device, or may be performed by a chip disposed in a terminal device. This is not limited in this application.

The method includes: The terminal device receives a configuration message from a network device. The configuration message is used to indicate a configured grant, and the configuration message includes information about a timer. The terminal device determines that the configured grant is used for a first hybrid automatic repeat request HARQ process, and starts the timer for the first HARQ process. To-be-sent data in the first HARQ process is data on a first logical channel. During running of the timer, when there is to-be-newly-transmitted data on a second logical channel, the timer stops, or the configured grant of the first HARQ process and information about the first HARQ process are sent to a HARQ entity. The terminal device sends the data on the second logical channel by using the configured grant.

The terminal device may start the timer for the first HARQ process in a plurality of cases. For example, after sending the data that is on the first logical channel, the terminal device starts or restarts the timer corresponding to the HARQ process. A resource used to send the data that is on the first logical channel may be a dynamically scheduled resource, or may be a configured grant resource. When the dynamically scheduled resource and the configured grant resource that are used to send the data that is on the first logical channel correspond to a same HARQ process (for example, denoted as a first HARQ process), a timer corresponding to the HARQ process is started or restarted. For another example, when a scheduling grant is received, and the scheduling grant resource and the configured grant resource correspond to a same HARQ process, a timer corresponding to the HARQ process is started or restarted. The dynamically scheduled resource may be a resource scheduled by using a C-RNTI or a resource scheduled by using a CS-RNTI.

It should be understood that the configuration message is used to indicate one or more configuration grants. One configuration grant includes, for example, indicating a location of a grant resource in time domain, and may be further used to indicate information such as a location of the grant resource in frequency domain, a resource size, a modulation and coding scheme (MCS), and a quantity of HARQ processes allowed to be used for configured grant sending, or a process number. This is not limited in this application. In addition, the configuration message includes the information about the timer. The timer is a timer corresponding to a configured grant of one HARQ process, or a timer corresponding to one configured grant. The timer is described in detail in the following. Alternatively, configured grant information may be indicated by using physical layer signaling.

Based on the foregoing technical solution, when a timer corresponding to a HARQ process is run, and to-be-sent data in the HARQ process is data on a logical channel (for example, denoted as data on a first logical channel), if there is to-be-newly-transmitted data on another different logical channel (for example, denoted as data on a second logical channel), to improve utilization of a configured grant resource and reduce a data conflict, running of the timer is stopped, or running of the timer is ignored, that is, a configured grant of the HARQ process and information about the HARQ process are sent to a HARQ entity, so that the configured grant of the HARQ process can be used to send the to-be-newly-transmitted data. In this way, the utilization of the configured grant resource can be improved, the data conflict can be reduced, timely transmission of newly transmitted data can be improved, and user experience can be improved. The to-be-sent data in the HARQ process may be initially transmitted or retransmitted data.

With reference to the first aspect, in some implementations of the first aspect, an attribute parameter of the first logical channel and an attribute parameter of the second logical channel meet a preset condition.

Based on the foregoing technical solution, the terminal device can flexibly perform transmission, for example, determine an attribute parameter of each logical channel, and when the preset condition is met, stop running of the timer, or send the configured grant of the HARQ process and the information about the HARQ process to the HARQ entity, so that the configured grant of the HARQ process is used to send the to-be-newly-retransmitted data; when the preset condition is not met, continue to run the timer. The preset condition may be predefined, for example, predefined in a protocol.

With reference to the first aspect, in some implementations of the first aspect, that an attribute parameter of the first logical channel and an attribute parameter of the second logical channel meet a preset condition includes: maximum physical uplink shared channel duration maxPUSCH-Duration of a first uplink grant resource of the first logical channel is greater than maxPUSCH-Duration of a second uplink grant resource of the second logical channel; a subcarrier spacing of a first uplink grant resource of the first logical channel is less than a subcarrier spacing of a second uplink grant resource of the second logical channel; a cyclic prefix CP length of a first uplink grant resource of the first logical channel is greater than a CP length of a second uplink grant resource of the second logical channel; or a modulation and coding scheme MCS index value of a first uplink grant resource of the first logical channel is greater than an MCS index value of a second uplink grant resource of the second logical channel.

Based on the foregoing technical solution, it may be determined, by separately using any one of the foregoing conditions or by using the foregoing conditions in combination, whether to stop running of the timer, or whether to send the configured grant of the HARQ process and the information about the HARQ process to the HARQ entity, so that the configured grant of the HARQ process is used to send the to-be-newly-retransmitted data, or continue to run the timer.

With reference to the first aspect, in some implementations of the first aspect, a priority of the second logical channel is higher than a priority of the first logical channel; a preemption priority of the second logical channel is higher than a preemption priority of the first logical channel; a latency requirement of the second logical channel is higher than a latency requirement of the first logical channel; or transmission reliability of the second logical channel is higher than transmission reliability of the first logical channel.

Based on the foregoing technical solution, when the terminal device is sending service data (for example, denoted as data on a first logical channel) with a low priority by using a scheduled resource or a configured grant resource, for example, eMBB data, if there is to-be-sent service data (for example, denoted as data on a second logical channel) with a high priority, for example, URLLC data, data with a high priority may be transmitted in time, thereby improving transmission performance of the data with a high priority.

With reference to the first aspect, in some implementations of the first aspect, sending of the data on the first logical channel is allowed to be preempted.

With reference to the first aspect, in some implementations of the first aspect, sending of the data on the second logical channel is allowed to be preempted.

With reference to the first aspect, in some implementations of the first aspect, when there is to-be-newly-transmitted data on the second logical channel, that the configured grant of the first HARQ process and information about the first HARQ process are sent to a HARQ entity further includes: flipping a new data indicator NDI of the first HARQ process.

According to a second aspect, a data sending method is provided. The method may be performed by a terminal device, or may be performed by a chip disposed in a terminal device. This is not limited in this application.

The method includes: The terminal device receives a configuration message from a network device. The configuration message is used to configure a configured grant for at least one HARQ process, and the configuration message includes information about a timer. When a timer corresponding to a first HARQ process in the at least one HARQ process is not run, a configuration grant of the first HARQ process is sent to a HARQ entity. To-be-sent data in the first HARQ process is data on a first logical channel. When the HARQ entity does not obtain to-be-newly-transmitted data that is on a second logical channel and that is used for the first HARQ process, a buffer of the first HARQ process is not flushed, or the timer corresponding to the first HARQ process is started or resumed. That the buffer of the first HARQ process is not flushed may be understood as a behavior of skipping or ignoring flushing the buffer of the first HARQ process.

The data on the first logical channel may be newly transmitted data, or may be retransmitted data.

A resource used to transmit the data that is on the first logical channel and a resource used to transmit the data that is on the second logical channel correspond to a same HARQ process (for example, denoted as a first HARQ process). The configuration grant of the first HARQ process is sent to the HARQ entity, that is, the configured grant of the first HARQ process and information about the first HARQ process are sent to the HARQ entity.

Based on the foregoing technical solution, there is to-be-sent data (for example, denoted as data on a first logical channel) in a HARQ process, and a timer corresponding to the HARQ process is not run. Therefore, when there is newly transmitted data (for example, denoted as data on a second logical channel), the newly transmitted data can be transmitted in time. When there is no newly transmitted data, that is, the HARQ entity does not obtain to-be-newly-transmitted data used for the HARQ process, a buffer of the HARQ process is not flushed, or the timer corresponding to the HARQ process is started or resumed. In this way, to-be-sent newly-transmitted data can be transmitted in time, thereby improving utilization of a configured grant resource, and to-be-sent data on the first logical channel in the HARQ process can be transmitted when no newly-transmitted data is arrived.

With reference to the second aspect, in some implementations of the second aspect, the method further includes: receiving a first uplink grant, where the first uplink grant is used to send the data that is on the first logical channel; and when the first uplink grant and the configured grant correspond to the first HARQ process, determining not to start or determining to delay starting the timer, or setting the timer to be in a suspended state.

The determining not to start or determining to delay starting the timer or setting the timer to be in a suspended state is for a status of the timer of the first HARQ process.

Based on the foregoing technical solution, when an uplink grant (for example, denoted as a first uplink grant, that is, a dynamically scheduled resource) is received, and the uplink grant and the configured grant correspond to or are used for a same HARQ process (for example, denoted as a first HARQ process), the status of the timer may be triggered to be a non-started state or a start delay state, or the status of the timer is set to be in the suspended state.

With reference to the second aspect, in some implementations of the second aspect, the method further includes: setting an identifier field, where the identifier field is used to identify not to start or identify to delay starting the timer, or setting the timer to be in the suspended state.

Based on the foregoing technical solution, the status of the timer may be quickly and simply determined based on the identifier field.

With reference to the second aspect, in some implementations of the second aspect, that the buffer of the first HARQ process is not flushed includes: When an identifier field for delaying starting the timer is set or the timer is set to be in the suspended state, the buffer of the first HARQ process is not flushed.

Based on the foregoing technical solution, whether to flush a buffer of a HARQ process may be determined based on an identifier field or directly based on a suspended state.

With reference to the second aspect, in some implementations of the second aspect, that the timer corresponding to the first HARQ process is started or resumed includes: when the identifier field for delaying starting the timer is set or the timer is set to be in the suspended state, starting or resuming the timer corresponding to the first HARQ process.

Based on the foregoing technical solution, whether to start or resume a timer corresponding to a HARQ process may be determined based on an identifier field or directly based on a suspended state.

With reference to the second aspect, in some implementations of the second aspect, an attribute parameter of the first logical channel and an attribute parameter of the second logical channel meet a preset condition.

With reference to the second aspect, in some implementations of the second aspect, that an attribute parameter of the first logical channel and an attribute parameter of the second logical channel meet a preset condition includes: maximum physical uplink shared channel duration max-PUSCH-Duration of a first uplink grant resource of the first logical channel is greater than maxPUSCH-Duration of a second uplink grant resource of the second logical channel; a subcarrier spacing of a first uplink grant resource of the first logical channel is less than a subcarrier spacing of a second uplink grant resource of the second logical channel; a cyclic prefix CP length of a first uplink grant resource of the first logical channel is greater than a CP length of a second uplink grant resource of the second logical channel; or a modulation and coding scheme MCS index value of a first uplink grant resource of the first logical channel is greater than an MCS index value of a second uplink grant resource of the second logical channel.

With reference to the second aspect, in some implementations of the second aspect, a priority of the second logical channel is higher than a priority of the first logical channel; a preemption priority of the second logical channel is higher than a preemption priority of the first logical channel; a latency requirement of the second logical channel is higher than a latency requirement of the first logical channel; or transmission reliability of the second logical channel is higher than transmission reliability of the first logical channel.

With reference to the second aspect, in some implementations of the second aspect, sending of the data on the first logical channel is allowed to be preempted.

With reference to the second aspect, in some implementations of the second aspect, sending of the data on the second logical channel is allowed to be preempted.

According to a third aspect, this application provides a data sending apparatus that has a function of implementing behavior of the terminal device in any aspect of the foregoing methods, and the apparatus includes units or components (means) corresponding to the steps or functions described in the aspects of the foregoing methods. The steps or functions may be implemented by using software, hardware, or a combination of hardware and software.

According to a fourth aspect, this application provides a data sending apparatus, including a processor, configured to be connected to a memory. The processor is configured to read and execute a program stored in the memory, to implement the method provided in the first aspect or the second aspect.

Optionally, there are one or more processors and one or more memories.

Optionally, the memory may be integrated into the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process such as sending of a configuration message may be a process in which the processor outputs the indication information, and receiving of capability information may be a process in which the processor receives the input capability information. Specifically, data output by the processor may be output to a transmitter, and input data received by the processor may be from a receiver. The transmitter and the receiver may be collectively referred to as a transceiver.

The apparatus in the fourth aspect may be a chip. The processor may be implemented by using hardware, or may be implemented by using software. When the processor is implemented by using the hardware, the processor may be a logic circuit, an integrated circuit, or the like; when the processor is implemented by using the software, the processor may be a general purpose processor, and is implemented by reading software code stored in the memory. The memory may be integrated into the processor, may be located outside the processor, and may exist independently.

According to a fifth aspect, this application provides a data sending apparatus, including a processor and an interface circuit. The processor is configured to: communicate with another apparatus through the interface circuit, and perform the method provided in the first aspect or the second aspect.

Optionally, there are one or more processors and one or more memories.

According to a sixth aspect, this application provides a program. When being executed by a processor, the program is used to perform the method provided in the first aspect or the second aspect.

According to a seventh aspect, this application provides a program product, for example, a computer-readable storage medium, including the program in the sixth aspect.

DETAILED DESCRIPTION OF ILLUSTRATIVE EMBODIMENTS

The following describes technical solutions in this application with reference to the accompanying drawings.

The technical solutions of embodiments of this application may be used in various communications systems, for example, but not limited to, a narrowband internet of things (NB-IoT) system, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

For ease of understanding the embodiments of this application, a communications system to which the embodiments of this application are applicable is described in detail with reference to FIG. 1.

Figure 1:
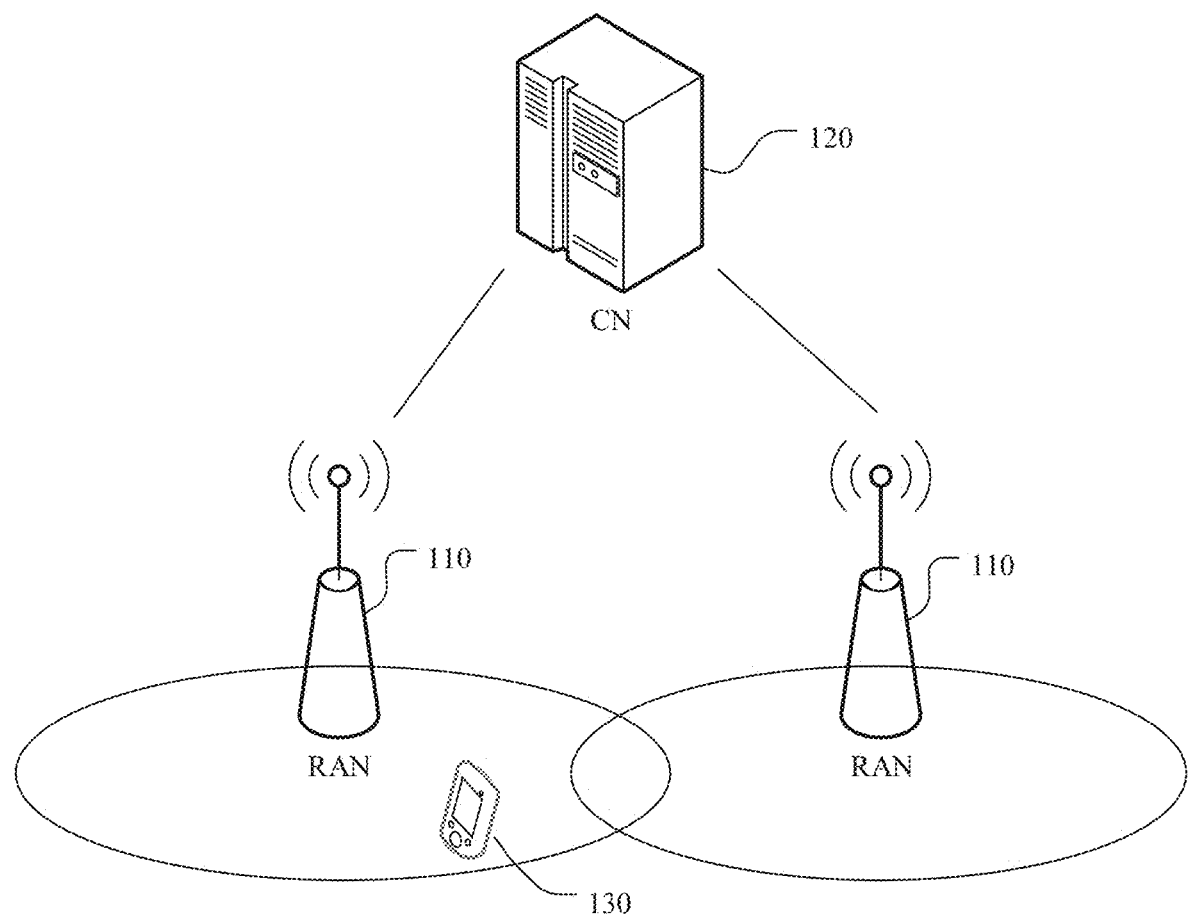
FIG. 1 is a schematic diagram of a communications system to which an embodiment of this application is applicable.

FIG. 1 is a schematic diagram of a communications system 100 to which an embodiment of this application is applicable. As shown in FIG. 1, a terminal 130 accesses a wireless network, to obtain a service from an external network (for example, the internet) over the wireless network or communicate with another terminal over the wireless network. The wireless network includes a RAN 110 and a core network (CN) 120. The RAN 110 is used to enable the terminal 130 to access the wireless network, and the CN 120 is used to manage the terminal and provide a gateway for communicating with the external network.

The terminal is also referred to as user equipment (UE), a mobile station (MS), a mobile terminal (MT), or the like, and is a device that provides a user with voice/data connectivity, for example, a handheld device or a vehicle-mounted device that has a wireless connection function. Currently, for example, the terminal is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

A network device is a device in the wireless network, for example, is a radio access network (RAN) node that enables a terminal to access the wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), and a wireless fidelity (WiFi) access point (AP). In a network structure, the network device may include a centralized unit (CU) node, a distributed unit (DU) node, or a RAN device that includes a CU node and a DU node.

Figure 2:
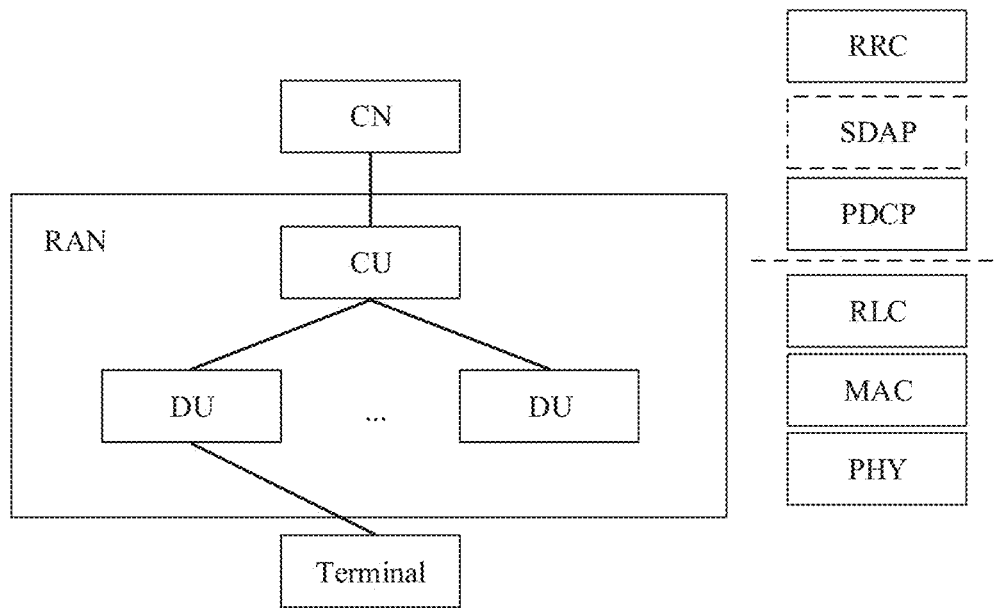
FIG. 2 is a schematic diagram of a network architecture to which an embodiment of this application is applicable.

FIG. 2 is a schematic diagram of a network architecture according to an embodiment of this application. As shown in FIG. 2, the network architecture includes a core network (CN) device and a RAN device. The RAN device includes a baseband apparatus and a radio frequency apparatus. The baseband apparatus may be implemented by one node, or may be implemented by a plurality of nodes. The radio frequency apparatus may be independently and remotely implemented from the baseband apparatus, or may be integrated into the baseband apparatus, or a part of the radio frequency apparatus is implemented remotely from the baseband apparatus and a remaining part is integrated into the baseband apparatus. For example, in an LTE communications system, the RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal complies with a specified protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In an implementation, a service data adaptation protocol (SDAP) layer may be further included above the PDCP layer.

The functions of these protocol layers may be implemented by one node, or may be implemented by a plurality of nodes. For example, in an evolved structure, the RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a protocol layer above the PDCP layer are set on the CU, and a function of a protocol layer below the PDCP layer, such as the RLC layer and the MAC layer, is set on the DU.

The RAN device may implement the functions of protocol layers such as radio resource control (RRC), a packet data convergence protocol (PDCP), radio link control (RLC), and media access control (MAC) by using one node. Alternatively, the functions of these protocol layers may be implemented by a plurality of nodes. For example, in an evolved structure, the RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a protocol layer above the PDCP layer are set on the CU, and a function of a protocol layer below the PDCP layer, such as the RLC layer and the MAC layer, is set on the DU.

Division of the protocol layers is merely an example, and division may alternatively be performed at another protocol layer, for example, at the RLC layer. Functions of both the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, performed based on latency. A function whose processing time needs to meet a latency requirement is set on the DU, and a function whose processing time does not need to meet the latency requirement is set on the CU.

In addition, the radio frequency apparatus may not be placed in the DU and is placed remotely from the DU, or may be integrated into the DU, or a part is placed remotely from the DU and a remaining part is integrated into the DU. This is not limited herein.

Figure 3:
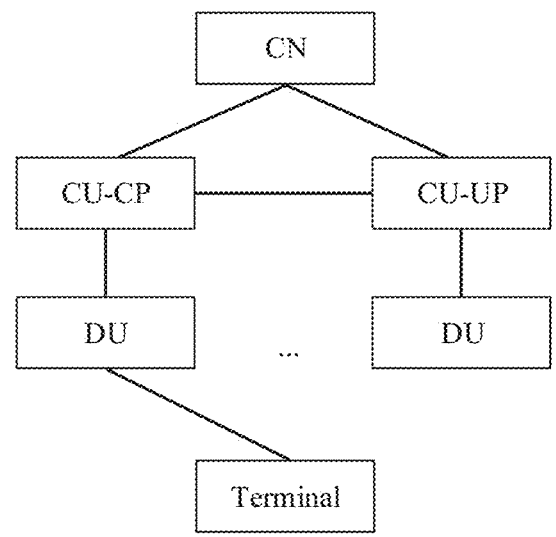
FIG. 3 is another schematic diagram of a network architecture to which an embodiment of this application is applicable.

FIG. 3 is another schematic diagram of a network architecture to which an embodiment of this application is applicable. Compared with the architecture shown in FIG. 2, a control plane (CP) and a user plane (UP) of a CU may be further separated into different entities for implementation, and the different entities are a control plane CU entity (CU-CP entity) and a user plane CU entity (CU-UP entity).

In the foregoing network architecture, signaling generated by the CU may be sent to a terminal by using the DU, or signaling generated by a terminal may be sent to the CU by using the DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at an RRC layer or a PDCP layer is finally processed as signaling at a PHY layer and sent to the terminal, or is converted from received signaling at a PHY layer. In the architecture, the signaling at the RRC layer or the PDCP layer may further be considered to be sent by the DU, or sent by the DU and a radio frequency.

In the foregoing embodiments, the CU is classified as a network device on a RAN side. In addition, the CU may alternatively be classified as a network device on a CN side. This is not limited herein.

An apparatus in the following embodiments of this application may be located in the terminal or the network device based on functions implemented by the apparatus. When the foregoing CU-DU structure is used, the network device may be a CU node, a DU node, or a RAN device that includes a CU node and a DU node.

It should be understood that FIG. 1 to FIG. 3 are merely examples for description, and should not constitute any limitation on this application.

For ease of understanding the embodiments of this application, several terms used in this application are first briefly described.

1. Dynamic grant-free transmission: Uplink transmission of a terminal device is completed without dynamic scheduling performed by a network device. Specifically, when uplink data is arrived, the terminal device does not send a scheduling request (SR) to the network device and does not wait for a dynamic grant of the network device, but may directly send the uplink data to the network device by using a transmission resource pre-allocated by the network device and a specified transmission parameter.

In NR, there may be two types of uplink dynamic grant-free transmission, to be specific, type 1 PUSCH transmission with a configured grant (type 1 PUSCH transmission with a configured grant, or type 1 configured grant configuration, or type 1 configured grant, or type 1 configured grant PUSCH transmission, or configured grant type 1), and type 2 PUSCH transmission with a configured grant (type 2 PUSCH transmission with a configured grant, or type 2 configured grant configuration, or type 2 configured grant, or type 2 configured grant PUSCH transmission, or configured grant type 2).

The network device may configure a configured grant configuration by using higher layer signaling, for example, a configured grant configuration information element (ConfiguredGrantConfig information element, ConfiguredGrantConfig IE) carried in a radio resource control (RRC) message. The terminal device may determine, based on a parameter configured in the ConfiguredGrantConfig IE, whether the configured grant configuration configured by the ConfiguredGrantConfig IE is a type 1 configured grant configuration or a type 2 configured grant configuration.

The following describes the two types of uplink dynamic grant-free transmission in detail.

The type 1 PUSCH transmission with a configured grant is referred to as a pre-configured grant type 1 for short in this embodiment of this application. In the pre-configured grant type 1, parameters configured in the configured grant configuration may include, for example, transmission parameters such as a periodicity of a time-frequency resource, an open-loop power control related parameter, a waveform, a redundancy version sequence, a quantity of repetitions, a frequency hopping mode, a resource allocation type, a quantity of hybrid automatic repeat request (HARQ) processes, a demodulation reference signal (DMRS) related parameter, a modulation and coding scheme (MCS) table, a resource block group (RBG) size, a time domain resource, a frequency domain resource, and an MCS. These parameters are merely used as examples, and are not used to limit composition of the parameters configured in the configured grant configuration. The parameters configured in the configured grant configuration may include all or some of the foregoing parameters, or may include another parameter. After receiving the higher layer parameter, the terminal device may directly transmit a PUSCH on a configured time-frequency resource by using the configured transmission parameter. Therefore, this transmission scheme may also be referred to as a fully RRC-configured uplink grant (fully RRC-configured UL grant).

The type 2 PUSCH transmission with a configured grant is referred to as a pre-configured grant type 2 for short in this embodiment of this application. In the pre-configured grant type 2, parameters configured in the configured grant configuration may include, for example, transmission parameters such as a periodicity of a time-frequency resource, an open-loop power control related parameter, a waveform, a redundancy version sequence, a quantity of repetitions, a frequency hopping mode, a resource allocation type, a quantity of HARQ processes, a DMRS related parameter, an MCS table, and an RBG group size. These parameters are merely used as examples, and are not used to limit composition of the parameters configured in the configured grant configuration. The parameters configured in the configured grant configuration may include all or some of the foregoing parameters, or may include another parameter. Afterwards, the network device may activate a configured grant configuration by using downlink control information (DCI) to perform PUSCH transmission. The DCI may optionally carry an index of the activated configured grant configuration. Transmission parameters such as a time domain resource, a frequency domain resource, a DMRS port number, and an MCS may be further configured in the DCI. Therefore, after receiving the configured grant configuration, the terminal device does not immediately perform PUSCH transmission. Instead, the terminal device determines an activated configured grant resource after receiving the DCI, and transmits, with reference to the transmission parameter indicated in the DCI, the PUSCH on a configured time-frequency resource based on the configured transmission parameter.

In other words, that the terminal device activates a configured grant resource is that a parameter in the configured grant configuration is made valid. The terminal device may determine, with reference to the parameter in the configured grant configuration and a parameter in the DCI for activating the configured grant configuration, the transmission resource and the transmission parameter that are used to transmit the PUSCH, so as to perform PUSCH transmission. Therefore, when a configured grant resource is activated by using the DCI, it may be considered that the DCI is used to activate dynamic grant-free transmission that is based on the configured grant configuration.

In addition, the network device may alternatively deactivate the configured grant configuration by using the DCI. Specifically, the DCI may carry an index of the deactivated configured grant configuration. The terminal device may determine the deactivated configured grant configuration based on the index.

In other words, that the terminal device deactivates a configured grant configuration is that a parameter in the configured grant configuration is made invalid. In addition, the terminal device may deactivate (or release) the configured grant configuration. Therefore, when a configured grant configuration is deactivated by using the DCI, it may be considered that the DCI is used to deactivate dynamic grant-free transmission that is based on the configured grant configuration.

For ease of description in the following, unless otherwise specified, the foregoing two type configured grant configurations are referred to as configured grants for short.

2. Retransmission mechanism: In some systems, for example, an NR system, a retransmission mechanism is specified. Retransmission managed by a MAC layer may be referred to as a HARQ. Simply, if a receiving end fails to receive data, the receiving end feeds back a negative acknowledgement (NACK) to a transmitting end, and the transmitting end retransmits the data that fails to be sent. In this mechanism, because the transmitting end may be simultaneously transmitting or wait to retransmit several pieces of data, concepts of a HARQ process and a HARQ process number are introduced to accurately identify one piece of data that needs to be retransmitted. Each HARQ process corresponds to a HARQ process number. In NR, for example, there are a maximum of 16 HARQ processes in one cell, and this means that a maximum of 16 data packets may be simultaneously transmitted or prepared for transmission. When scheduling uplink data, the network device indicates, in an explicit or implicit manner, a HARQ process number corresponding to the data. When the network device wants to schedule retransmission of the data, the network device also indicates the HARQ process number, and the terminal device knows which piece of data needs to be retransmitted.

3. HARQ process number: A HARQ uses a stop-and-wait protocol to send data. Uplink transmission is used as an example. After sending a transport block (TB), the terminal device stops to wait for acknowledgement information. The network device may perform acknowledgement (ACK) or NACK on the transport block by using 1-bit information. However, the terminal device stops to wait for acknowledgement after each transmission, and this results in a very low throughput. Therefore, the terminal device may use a plurality of parallel HARQ processes. When a HARQ process is waiting for acknowledgement information, the terminal device may continue to send data by using another HARQ process.

The HARQ process number is also referred to as a HARQ process identifier (ID). One HARQ process number may be used to uniquely specify one HARQ process. After performing channel coding on the transport block, the terminal device may store data obtained through channel coding in a buffer to wait for sending. There may be a one-to-one correspondence between a transport block in a buffer and a HARQ process, and each transport block may correspond to one HARQ process. The correspondence between the transport block and the HARQ process may be reflected by using a correspondence between a transport block and a HARQ process number. Therefore, the terminal device may predetermine the correspondence between the transport block and the HARQ process number.

Because the network device includes the HARQ process number in the DCI, there is a correspondence between a HARQ process number and a time-frequency resource indicated in the DCI. In other words, when the transport block is transmitted based on the time-frequency resource indicated in the DCI, the HARQ process number corresponding to the transport block is a HARQ process number included in the DCI. Therefore, both the network device and the terminal device may determine the correspondence between the time-frequency resource and the HARQ process number.

When the network device fails to successfully decode data received on a time-frequency resource, or fails to receive data on a time-frequency resource, the network device may notify, by using the DCI, the terminal device of the HARQ process number corresponding to the time-frequency resource. The terminal device may determine, based on the correspondence between the HARQ process number and the transport block, a transport block that needs to be retransmitted.

For ease of description in the following, unless otherwise specified, the foregoing HARQ process number is referred to as a HARQ ID for short.

4. Repetition mechanism: For a resource, if a repetition is configured for the terminal device, the terminal device automatically considers by default that there are resources with a same size and a same location at K subsequent time points, and the terminal device repeatedly sends data on these resources for K times. In other words, the terminal device automatically retransmits the data. K may be configured by the network device.

5. Transport block (TB): The transport block may be a data block from a higher layer (relative to a physical layer). For example, one transport block may include one data block of a media access control (MAC) protocol data unit (PDU). The data block may be transmitted in one time unit, or may be a unit of HARQ retransmission. In existing LTE and NR, each terminal device may send a maximum of two transport blocks in each time unit. As an example instead of a limitation, the time unit is, for example, physical uplink shared channel duration (PUSCH duration), sending duration of one transport block, sending duration of one transport block on one grant resource, or a transmission time interval (TTI).

6. Ultra-reliable low-latency communication (URLLC) may be understood as a type of service that has a relatively high requirement on latency. A URLLC service is usually an emergency service, and has a very high requirement on transmission reliability and a transmission latency. Usually, it is required that the latency ranges from 1 ms to 50 ms, and the transmission reliability ranges from 99.9% to 99.9999%. In addition, a packet loss rate needs to be kept within a strictly controllable range.

In this embodiment of this application, without loss of generality and for differentiation, an emergency service such as a service (for example, the URLLC service) that has a relatively high requirement on the latency is referred to as a service #1 for short, and data corresponding to the service #1 is referred to as data #1 for short.

7. Enhanced mobile broadband (eMBB) may be understood as a type of service that has a lower requirement on the latency than the service #1. An eMBB service provides a large amount of data, but may not have a high requirement on the latency.

In the embodiments of this application, without loss of generality and for differentiation, a service that has a lower emergency degree than that of the service #1, for example, a service (for example, the eMBB service) that has a relatively low requirement on the latency, is referred to as a service #2 for short, and data corresponding to the service #2 is referred to as data #2 for short.

In some communications systems, for example, an NR communications system, both the foregoing two services (that is, the service #1 and the service #2) need to be supported. In addition, there may be a case in which there are communications requirements of two services in one terminal device. For example, a vehicle may have URLLC data related to self driving that has an emergent requirement for latency, or may have multimedia eMBB data such as a live video.

8. Logical channel (LCH): The network device may configure one or more logical channels for the terminal device. Each logical channel may correspond to a quality of service (QoS) requirement of one service.

In some systems, for example, in an NR system, a service is carried on a logical channel. For example, the terminal device may need both an internet access service and a voice service (for example, Voice over LTE, VoLTE). Therefore, two different logical channels may be configured to receive or send data of different services.

Therefore, to place a proper service on a proper resource, the network device pre-configures a mapping relationship between a logical channel and a resource parameter for the terminal device. After receiving an uplink resource, the terminal device selects, based on a parameter of the uplink resource, a data assembly packet from a logical channel that can be mapped, and this reduces a possibility of placing improper data.

After the terminal device receives a resource that can be used to transmit data, the terminal device may select different data assembly packets based on a parameter of the resource, thereby reducing a possibility that data is placed on an improper resource. In this way, a case in which a service requirement cannot be met or efficiency of a communications system is reduced due to the possibility occurs decreasingly. For example, if the uplink resource used to transmit data is a resource used to transmit the URLLC service, the terminal device places data of the URLLC service on the uplink resource.

When there is newly transmitted data, a MAC entity selects a proper logical channel for each uplink grant resource. Because in NR, a physical resource may support parameters such as a plurality of pieces of numerology and transmission duration, the MAC layer may determine a matched logical channel based on parameters such as numerology and transmission duration of each uplink grant resource. The numerology may be understood as a parameter used in a communications system, for example, may include a subcarrier spacing (SCS), a symbol length, a cyclic prefix (CP) length, a quantity of resource blocks (RB), a slot length, or a frame format. It should be understood that specific content included in the numerology enumerated herein is merely an example for description, and shall not constitute any limitation on this application. For example, the numerology may further include a parameter of another granularity that can be supported in NR.

One uplink grant resource may match one or more logical channels, and there is only one MAC layer protocol data unit (PDU) (namely, a MAC PDU) mapped to the uplink grant resource, but there may be a plurality of multiplexed logical channels. In this case, each logical channel may also be allocated with a priority. The MAC entity may map data that is on the logical channels to the MAC PDU in descending order of priorities of the logical channels.

In the embodiments of this application, without loss of generality and for differentiation, the service #1 represents a service carried on a first logical channel, and the service #2 represents a service carried on a second logical channel. A quantity of service types carried on each logical channel is not limited in the embodiments of this application.

9. Configured grant timer: For a configured grant, a configured grant timer (which may also be referred to as a timer for short in this application) is further specified. After sending one piece of data on a configured grant resource, the terminal device starts the configured grant timer. During running of the configured grant timer, the terminal device cannot send data by using a configured grant resource whose HARQ process is the same as a HARQ process of the configured grant resource that has been used to send data. The configured grant is used for new transmission. If previous data has not been successfully transmitted, or is still waiting for scheduling retransmission by the network device or other feedback information, and there is a new configured grant resource belonging to the same HARQ process, the terminal device performs new transmission, and a new data packet overwrites an old data packet. Consequently, the network device has no opportunity to perform scheduling retransmission. Therefore, the configured grant timer is intended to provide a processing time and a feedback time for the network device. After timeout, the terminal device determines that the network device does not perform scheduling retransmission again, and then can use a resource corresponding to the HARQ ID. The configured grant timer is maintained by each HARQ process. That is, the configured grant timer is used to restrict only use of a configured grant resource corresponding to the HARQ process. A configured grant resource corresponding to another HARQ process can still be used.

For ease of description in the following, unless otherwise specified, the configured grant timer is a configured grant timer corresponding to a HARQ process corresponding to a resource #1 or a resource #2.

For the configured grant timer, the network device dynamically schedules a resource. If the dynamically scheduled resource is shared with a HARQ process of a configured grant, the terminal device also starts a configured grant timer corresponding to the HARQ process, so as to resolve a problem that configured grant resources corresponding to a same HARQ process arrive, the terminal device triggers new transmission by using a configured grant of the HARQ process, and a new data packet overwrites an old data packet. After sending data by using the scheduled resource, the terminal device restarts the configured grant timer.

The network device configures a periodic configured grant for the terminal device, and configures a quantity K of repetition times. After the terminal device initially transmits data (which may be understood as an initial repetition) by using the configured grant, the terminal device starts or restarts the configured grant timer corresponding to the HARQ process. The configured grant timer is not restarted again when the data is sent again subsequently.

In this mechanism, latency of URLLC data in the terminal device increases in the following cases.

The network device configures a periodic configured grant for the terminal device. In this case, the terminal device needs to send eMBB data, and the network device dynamically schedules a resource. If the dynamically scheduled resource is shared with a HARQ process of a configured grant, the terminal device also starts a configured grant timer corresponding to the HARQ process. However, if the terminal device needs to send URLLC data in this case, and a HARQ process of the latest configured grant is the same as the HARQ process of the scheduled resource, the URLLC can be sent by using the configured grant only after the eMBB is sent. As a result, a URLLC data latency increases.

If the terminal device first sends eMBB data by using the configured grant, the terminal device also starts the configured grant timer corresponding to the HARQ process. However, if the terminal device needs to send URLLC data in this case, and a HARQ process of the latest configured grant is the same as the HARQ process of the scheduled resource, similarly, the URLLC data can be sent by using the configured grant only after the eMBB data is sent. As a result, a URLLC data transmission latency increases.

In view of this, this application provides a data sending method, so as to preferably process some emergency service data, for example, the URLLC service, to improve a low-latency and high-reliability requirement of this type of service, reduce a transmission latency, and improve user experience.

For ease of understanding embodiments of this application, the following several descriptions are provided before the embodiments of this application are described.

In the embodiments of this application, the "uplink grant" may be understood as signaling used to schedule a physical uplink resource, for example, downlink control information used for the uplink grant, or radio resource control (RRC) signaling used for a semi-persistent configuration, or downlink control information used to activate an uplink grant resource in a semi-persistent configuration manner. The "uplink grant resource" may be understood as a resource indicated by the uplink grant. Both the "uplink grant" and the "uplink grant resource" may correspondingly be UL grants, and a person skilled in the art may understand meanings of the "uplink grant" and the "uplink grant resource".

In the embodiments of this application, "predefinition" may be implemented by pre-storing corresponding code or a corresponding table in a device (for example, a terminal device or a network device) or in another manner that can be used to indicate related information. A specific implementation of "predefinition" is not limited in this application. For example, the predefinition may be defined in a protocol.

"Storage" in the embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. A type of the memory may be a storage medium in any form, and this is not limited in this application.

The "protocol" may be a standard protocol in the communications field, for example, may include an LTE protocol, an NR protocol, and a related protocol used in a future communications system. This is not limited in this application.

In the following embodiments, terms such as "first" and "second" are merely intended to distinguish between different objects, and should not constitute any limitation on this application.

The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

The term "a plurality of" indicates two or more, and another quantifier is similar to this. The term "and/or" describes an association relationship for describing associated objects and represents that three relationships may exist. For example, A and/or B may represent the following three cases: Only A exists, both A and B exist, and only B exists.

The technical solutions of this application may be used in a wireless communications system, for example, the communications system 100 shown in FIG. 1. Without loss of generality, the following first describes the embodiments of this application in detail by using an uplink transmission process between one terminal device and one network device as an example. It may be understood that any terminal device in the wireless communications system or a chip disposed in the terminal device may send uplink data based on a same method, and any network device in the wireless communications system or a chip disposed in the network device may receive uplink data based on a same method. This is not limited in the embodiments of this application.

Figure 4:
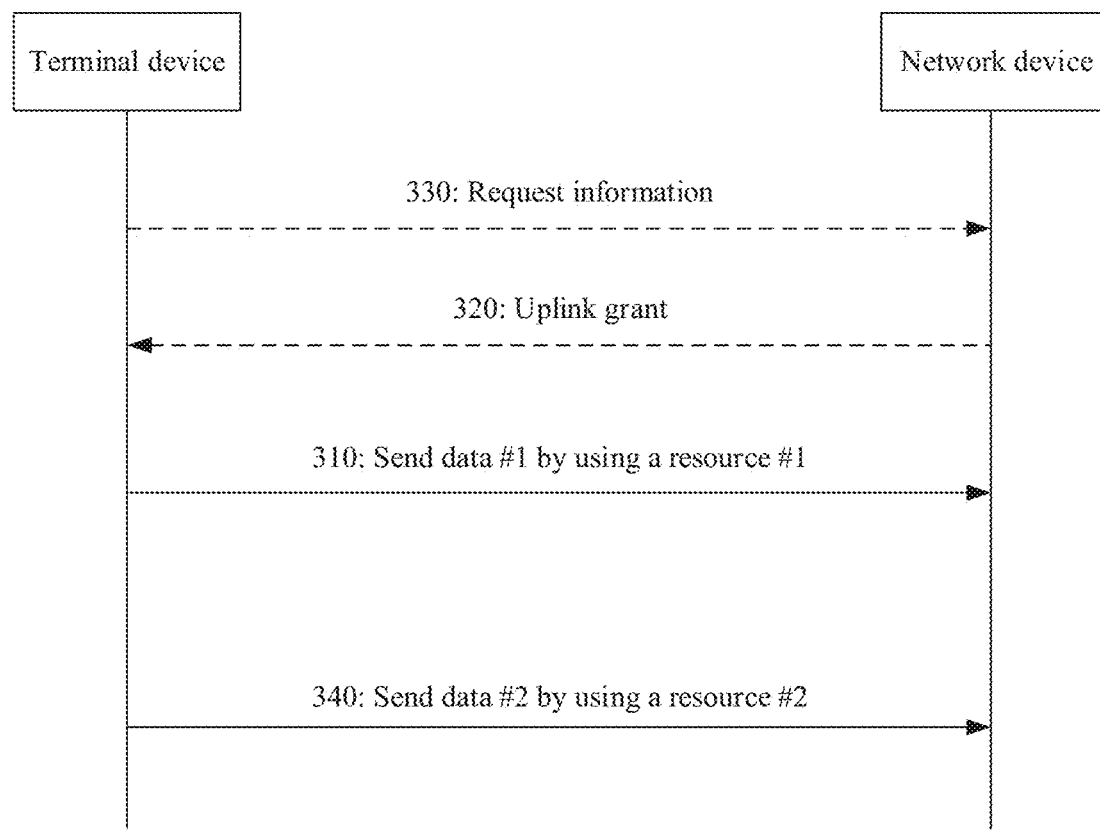
FIG. 4 is a schematic interaction diagram of a data sending method according to an embodiment of this application.

FIG. 4 is a schematic interaction diagram of a data sending method 300 from a perspective of device interaction. As shown in the figure, the method 300 shown in FIG. 4 may include step 310 to step 340. The following describes the steps in the method 300 in detail with reference to FIG. 4.

Optionally, in step 310, a terminal device sends data #1 by using a resource #1.

As described above, in the following embodiments, for brevity, the data #1 is used to represent data (for example, URLLC data) belonging to a service #1, the resource #1 is used to represent a part or all of resources used when the data of the service #1 is sent, and the service #1 may be a service carried on a first logical channel. Data #2 is used to represent data (for example, eMBB data) belonging to a service #2, the resource #2 is used to represent a part or all of resources used when the data of the service #2 is sent, and the service #2 may be a service carried on a second logical channel. The data #1 may be initially transmitted data or may be retransmitted data, and the data #2 indicates newly transmitted data or initially transmitted data. The resource #2 is a configured grant resource. In this embodiment, a meaning of new transmission is the same as that of initial transmission, to be specific, a data block is sent for the first time by using a resource.

In some systems, for example, in an NR system, data transmission is controlled by a network device (for example, a base station). The network device delivers control signaling to indicate a resource used to transmit data. If the resource used to transmit data is an uplink resource, the terminal device assembles a data packet based on a size of the resource and sends the data packet to the network device on the indicated resource.

Therefore, optionally, before step 310, step 320 is included. In step 320, the network device sends an uplink grant (that is, an example of a configuration message) to the terminal device. Correspondingly, the terminal device receives the uplink grant sent by the network device.

Specifically, the uplink grant may be understood as signaling sent by the network device to the terminal device, and the signaling may be used to indicate a resource scheduled by the network device for the terminal device. For example, the uplink grant may indicate a resource location of an uplink grant resource, for example, a time domain location and a frequency domain location of the uplink grant resource. The uplink grant may further indicate a size of the uplink grant resource. The uplink grant may further indicate a modulation and coding scheme that matches the uplink grant resource. In other words, when data is sent by using the uplink grant resource, the modulation and coding scheme that matches the uplink grant resource is used to perform coding and modulation processing on the data.

In a possible design, the uplink grant may be carried in downlink control information.

The downlink control information may be sent by the network device based on a scheduling request of the terminal device. Resource allocation in the downlink control information may indicate the resource location of the uplink grant resource. In this design, a HARQ ID to which data belongs is directly indicated by the downlink control information.

The downlink control information may be DCI, or may be other signaling that may be used to carry downlink control information and that is transmitted on a physical downlink control channel.

It should be understood that the physical downlink control channel herein may be a physical downlink control channel (PDCCH), an EPDCCH (enhanced PDCCH, enhanced physical downlink control channel), or another downlink channel that is defined to have the foregoing function with evolution of a network.

In this design, the uplink grant resource may be dynamically scheduled, and this design may also be referred to as dynamic scheduling.

In another possible design, the uplink grant may be carried in RRC signaling.

The RRC signaling may indicate an uplink grant resource pre-configured for the terminal device to use. A pre-configured grant configuration (ConfiguredGrantConfig) information element (IE) in the RRC signaling may carry a start location, a resource size, and a periodicity that are of the uplink grant resource, so that the terminal device determines the time domain location and the frequency domain location of the uplink grant resource. A resource indicated by the RRC signaling appears periodically until the resource is deleted by the RRC signaling. The configuration manner is the pre-configured grant type 1 described above. The pre-configured grant type 1 is described in detail above. For brevity, details are not described herein again. In the configuration manner, the uplink grant may be RRC signaling.

In another possible design, the uplink grant may be downlink control information.

The network device may first indicate, by using RRC signaling, information such as a periodicity of an uplink grant resource pre-configured for the terminal device to use. When receiving the downlink control information, the terminal device may activate and start to use the pre-configured uplink grant resource based on information carried in the downlink control information, for example, a start location and a resource size that are of the uplink grant resource, and an MCS that matches the uplink grant. The downlink control information may indicate a specific resource. Unless a deactivation command is received, otherwise, a resource indicated by the downlink control information periodically appears. The configuration manner is the pre-configured grant type 2 described above. The pre-configured grant type 2 is described in detail above. For brevity, details are not described herein again. In the configuration manner, the uplink grant may be downlink control information.

In this design, the uplink grant resource may be pre-configured, for example, may be a semi-persistent scheduling (SPS) resource or a pre-configured grant resource.

In this design, the uplink grant resource may serve a periodic service, and the network device does not need to deliver control signaling each time to allocate a resource, thereby reducing control signaling overheads. The uplink grant resource may also be used for some latency-sensitive services, for example, a URLLC service. This type of service has a high requirement on latency, and this type of service may arrive at any time. If a resource is requested by using a scheduling request or random access, this may be very slow. Therefore, the network device pre-configures a periodic resource, and the terminal device has data of this type of service, and soon has an uplink resource to send the data. In this way, the latency can be reduced. To save resources, these periodic resources may be shared by a plurality of terminal devices, and the network device may decode a data packet provided that terminal devices on a same periodic resource are not excessively dense and some coding protection processing is performed.

Because of sharing of these periodic resources, to enable another service, for example, an eMBB service, not to use these resources, a conflict occurs with, for example, data of a URLLC service of another terminal device that shares the resource (where although there is a probability that some conflicts may be successfully decoded, a decoding success rate is reduced after all). The network device maps, by using a mapping relationship between a logical channel and a resource parameter, only a logical channel of the data of the URLLC service to these resources. In this way, the data of the eMBB service cannot use these resources.

It should be understood that the signaling used to carry the uplink grant and the manner of indicating the uplink grant resource by using the signaling that are listed above are merely examples for description, and should not constitute any limitation on this application. This application neither excludes a possibility that another piece of signaling is used to carry the uplink grant, nor excludes a possibility that another manner or another field is used to indicate the uplink grant resource.

In this embodiment of this application, when sending data by using a grant resource (for example, a dynamically scheduled resource or a configured grant resource), the terminal device may use a part or all of the grant resource. This is not limited in this embodiment of this application. For brevity, descriptions are provided below by using an example in which data is sent by using a grant resource.

The uplink grant in step 320 may be an initial transmission resource or a retransmission resource, scheduled by using a cell radio network temporary identifier (C-RNTI), or may be a retransmission resource scheduled by using a configured scheduling radio network temporary identifier (CS-RNTI). This is not limited in this embodiment of this application.

For example, the uplink grant is carried in DCI. The DCI may be DCI scrambled by using a specific type of radio network temporary identifier (RNTI). When receiving the DCI, the terminal device may determine, based on the type of the RNTI for scrambling the DCI, that the DCI is used for retransmission scheduling. In other words, the network device may implicitly indicate, by scrambling the DCI by using the CS-RNTI, that the DCI is used for retransmission scheduling.

It should be understood that the CS-RNTI is merely an example of the foregoing specific type of RNTI, and shall not constitute any limitation on this application. The specific type of RNTI may further include another dynamic grant-free transmission-specific RNTI or higher-layer configured transmission-specific RNTI. In a protocol, functions of DCI scrambled by using different types of RNTIs may be predefined. For example, that DCI scrambled by using a type of RNTI is used for initial transmission scheduling may be defined, or that DCI scrambled by using another type of RNTI is used for retransmission scheduling may be defined. The network device may generate the DCI based on the predefined RNTI type and the function of the DCI, and the terminal device may further parse the DCI based on the predefined RNTI type and the function of the DCI.

Before the network device delivers the uplink grant, the network device may not know that the terminal device has data to be sent. Therefore, the terminal device needs to first request, by using a pre-configured uplink resource or a common uplink resource, the network device to allocate a resource. For example, the terminal device may request an uplink resource by using a scheduling request, or the terminal device may request an uplink resource by using a random access channel (RACH). A resource used by the scheduling request is a resource that is pre-configured by the network device for the terminal device and that is used to request the uplink resource, and a resource used for random access is carried on a common random access channel.

Therefore, optionally, before step 320, step 330 is included. In step 330, the terminal device sends request information to the network device, where the request information is used to request a resource used to transmit data. Correspondingly, the network device receives the request information sent by the terminal device, and allocates, to the terminal device based on the request information, the resource used to transmit data.

In step 340, the terminal device sends the data #2 by using the resource #2.

Figure 5:
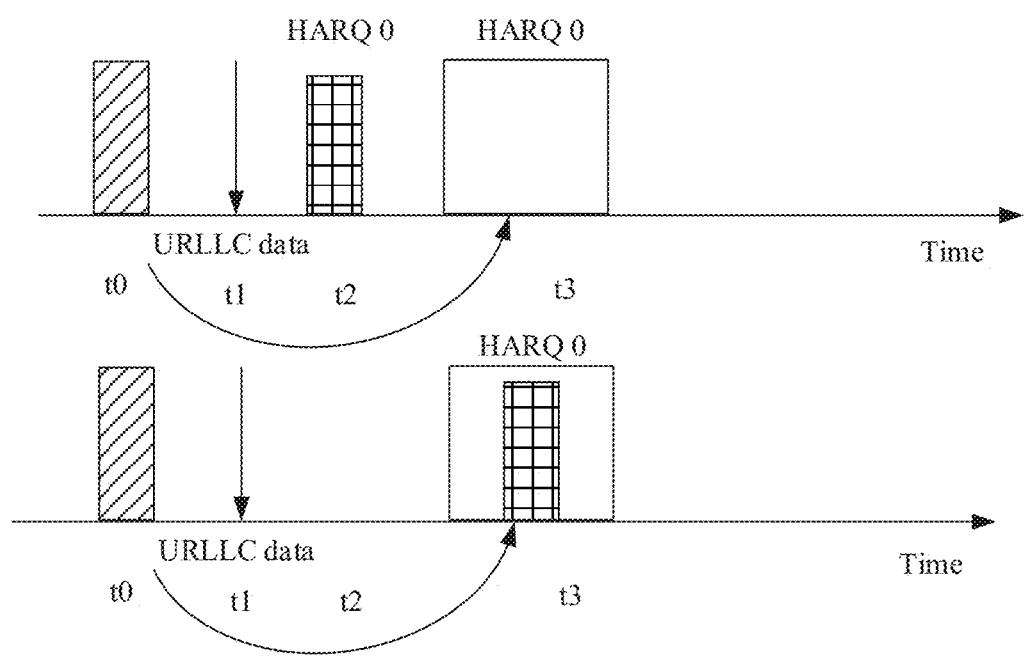
FIG. 5 is a schematic diagram of a data conflict to which an embodiment of this application is applicable.

In a process in which the terminal device sends the data #1 by using the resource #1, the data #2 may arrive (in other words, the terminal device needs to send the data #2). As shown in FIG. 5, in a process in which the terminal device sends eMBB data (that is, an example of data #1) on a scheduling grant resource #1, URLLC data (that is, an example of data #2) is arrived, and the resource #1 and a configured grant resource (that is, an example of a resource #2) used to send the URLLC data correspond to a same HARQ ID (for example, a HARQ o in FIG. 5).

In this embodiment of this application, if the data #2 is arrived, the terminal device can send the data #2 by using the resource #2. In this embodiment of this application, the resource #2 indicates a configured grant resource. When the data #2 is arrived, there are a plurality of possible statuses of the data #1. For ease of understanding, processing performed by the terminal device on data at each protocol layer is briefly described.

First, the terminal device may perform, at a PDCP layer, packet header compression on an internet protocol (IP) data packet from an upper layer or a protocol data unit at a service data adaptation protocol (SDAP) layer (SDAP PDU for short) in an NR system, and may further encrypt the data packet, to generate a PDU at a PDCP layer (PDCP PDU for short) and then send the PDCP PDU to an RLC layer.

Then, the terminal device may perform, at the RLC layer, packet assembly on the data packet from the PDCP layer, for example, segment or concatenate the data packet or assemble one data packet, to generate an RLC PDU and send the RLC PDU to a MAC layer. The RLC layer may provide a service for the PDCP layer. In the NR system, concatenation may not be performed on a data packet at an upper layer.

Then, the terminal device may determine, at the MAC layer, a sending format of an air interface, for example, a size of a data block, a physical resource that matches the size of the data block, and an MCS that matches the physical resource. The terminal device may generate, based on the MCS, a MAC PDU (that is, a transport block (TB)) that matches a size of the resource, and then send the MAC PDU to the physical layer.

Then, the terminal device may perform, at the physical layer, processing such as channel coding, rate matching, interleaving, scrambling, and modulation on the transport block from the MAC layer, and then transmit, by using an antenna, a signal generated through modulation. The physical layer may provide a service to the MAC layer in a form of a transport channel (TCH).

It should be understood that, for ease of understanding, the foregoing briefly describes, with reference to a protocol stack structure in NR, an operation performed by the terminal device on the uplink data at each protocol layer. A specific implementation process of each process imposes no limitation on the protection scope of the embodiments of this application, for example, the process may be the same as that in the conventional technology.

It can be learned from the foregoing that when the data #2 is arrived, a status of the data #1 includes at least any one of the following several cases. In a possible case, the MAC layer is assembling a new packet of the data #1 based on the resource #1. In another possible case, the MAC layer has already assembled a new packet of the data #1 based on the resource #1, but has not submitted the new packet to the physical layer. In another possible case, the MAC layer has used the resource #1 to assemble a new packet of the data #1, and submits the new packet to the physical layer. In another possible case, the MAC layer has not submitted the resource #1 to the physical layer for retransmission. The MAC layer submits the resource #1 to the physical layer for retransmission, and so on.

It should be understood that a specific status of the data #1 does not limit the protection scope of the embodiments of this application.

To enable the data #2 to be transmitted in time, this embodiment of this application provides at least two methods: ignoring or stopping a running state of a configured grant timer, or delaying a running occasion of a configured grant timer.

It should be understood that, in this embodiment of this application, the mentioned configured grant timer is a configured grant timer corresponding to a HARQ process. In other words, the configured grant timer restricts use of a configured grant resource of the HARQ process corresponding to the configured grant timer.

The first method is to ignore or stop the running status of the configured grant timer.

When the data #2 is arrived, a status of the configured grant timer may be a running state. It can be learned from the foregoing descriptions of the configured grant timer that the configured grant timer may be triggered to run in any one of the following cases:

In one case, the resource #1 is received. If the resource #1 and the resource #2 correspond to a same HARQ process, a configured grant timer corresponding to the HARQ process is started or restarted. The resource #1 is a dynamically scheduled resource, and the resource #2 is a configured grant resource.

In another case, after the data #1 is sent by using the resource #1, a timer corresponding to the HARQ process is started or restarted. The resource #1 is a dynamically scheduled resource.

In another case, after the data #1 is sent by using the resource #1, a timer corresponding to the HARQ process is started or restarted. The resource #1 is a configured grant resource.

Running of the configured grant timer may be triggered in the foregoing three cases. A specific triggering manner is not limited in this embodiment of this application.

It is assumed that when the data #2 is arrived, the configured grant timer is in a running state. Because the configured grant timer is started, configured grant resources of a same HARQ process cannot be submitted to a HARQ entity, and packet assembly cannot be performed. Even if the terminal device wants to terminate data transmission of the data #1 and change to send the data #2, actually, a packet assembly process cannot be completed because a corresponding resource cannot be obtained. Therefore, in this embodiment of this application, when it is determined whether a configured grant resource of a HARQ process can be submitted to a HARQ entity, it is not only determined whether a configured grant timer corresponding to the HARQ process is run. If new data is arrived or the data #2 is to be initially transmitted, but the data #1 is being sent by using the resource #1 (for example, the dynamically scheduled resource or the configured grant resource), regardless of whether the configured grant timer corresponding to the HARQ process is run, a configured grant resource of the HARQ ID is submitted to the HARQ entity. That new data is arrived may also be understood as that data with a higher priority is arrived. Specifically, a manner such as stopping the configured grant timer or ignoring a running state of the configured grant timer is used. For example, when the resource #1 is a configured grant resource, a new data indicator (NDI) of the HARQ process is flipped, so as to perform new transmission, and send a configured uplink grant of the HARQ process and related information about the HARQ process to the HARQ entity. For another example, when the resource #1 is a dynamically scheduled resource, the configured grant timer is stopped, and a configured grant resource of a HARQ process of the scheduled resource is submitted to the HARQ entity, so as to newly transmit a data block of the data #2.

Whether the configured grant timer can be stopped or whether the running state of the configured grant timer can be ignored may be determined in any one of the following manners. In other words, whether to send the data #2 is determined in any one of the following manners.

Method 1: Determine, based on a data attribute, whether the configured grant timer can be stopped or whether the running state of the configured grant timer can be ignored.

When available new data or to-be-newly-transmitted data is data (that is, an example of data #2) in the service #2, data in a HARQ ID corresponding to a configured grant resource belongs to data (that is, an example of data #1) in the service #1, ignoring or stopping running of the configured grant timer is determined based on data attributes of the data #1 and the data #2, so that the configured grant resource corresponding to the HARQ ID can be used to send the data #2. Optionally, the available new data is new uplink data whose priority is higher than that of any logical channel including data in any logical channel group (LCG).

In a possible implementation, when it is determined that a priority of the data #2 is higher than a priority of the data #1, it is determined to stop the configured grant timer or ignore the running state of the configured grant timer.

The priority of the data #2 is higher than the priority of the data #1. In other words, it may be understood as that a priority of the first logical channel is higher than a priority of the second logical channel, or a priority of a service carried on the first logical channel is higher than a priority of a service carried on the second logical channel.

That the priority of the data #2 is higher than the priority of the data #1 may mean that a reliability requirement of the data #2 is higher than that of the data #1, and/or a latency requirement of the data #2 is higher than that of the data #1, and the like.

In another possible implementation, when a length of maxPUSCH-Duration of a resource that can be used by the data #2 is less than a length of maxPUSCH-Duration of a resource that can be used by the data #1, it is determined to stop the configured grant timer or ignore the running state of the configured grant timer.

In another possible implementation, when a subcarrier spacing of the resource that can be used by the data #2 is greater than a subcarrier spacing of the resource that can be used by the data #1, it is determined to stop the configured grant timer or ignore the running state of the configured grant timer.

It should be understood that in the method 1, only a plurality of possible implementations are listed as examples to determine whether the configured grant timer can be stopped or whether the running state of the configured grant timer can be ignored. This is not limited in this embodiment of this application. Any method for determining, by using data, whether the configured grant timer can be stopped or whether the running state of the configured grant timer can be ignored falls within the protection scope of this embodiment of this application. For example, the foregoing plurality of possible implementations may be separately used or may be used in combination.

Method 2: Determine, based on information about a logical channel, whether the configured grant timer can be stopped or whether the running state of the configured grant timer can be ignored.

For example, whether the configured grant timer can be stopped or whether the running state of the configured grant timer can be ignored is determined based on a correspondence between a logical channel and data.

It is assumed that an uplink grant resource indicated by the uplink grant received by the terminal device is a resource that matches a logical channel carrying service data. The terminal device may determine, based on the method in the conventional technology, the resource that matches the logical channel carrying the service data. For example, the terminal device matches a corresponding uplink grant resource based on some information of the logical channel carrying the service data, for example, parameters such as transmission duration and a subcarrier spacing in numerology. Because a specific method for determining, by the terminal device, the resource that matches the logical channel may be the same as that in the conventional technology, for brevity, details are not described herein.

In this embodiment of this application, a correspondence between a logical channel and a service, or a correspondence between a logical channel and data of a service may be used to determine whether the configured grant timer can be stopped or whether the running state of the configured grant timer can be ignored. It is assumed that a logical channel #1 corresponds to the data #1, that is, the logical channel #1 carries data of the service #1. A logical channel #2 corresponds to the data #2, that is, the logical channel #2 carries data of the service #2.

In a possible implementation, the terminal device receives, from the network device, configuration information for configuring a logical channel, where the configuration information indicates that the data #2 belongs to the logical channel #2. If the data #1 (that is, data that is being sent by using a HARQ ID corresponding to a configured grant resource) does not belong to the logical channel #2, running of the configured grant timer (that is, a configured grant timer corresponding to a HARQ process) may be stopped, or the configured grant corresponding to the HARQ process and related information about the HARQ process may be sent to the HARQ entity.

In another possible implementation, the terminal device receives, from the network device, configuration information for configuring a logical channel, where the configuration information indicates that the data #1 (that is, data that is being sent by using a HARQ ID corresponding to a configured grant resource) belongs to the logical channel #1. If there is to-be sent data #2 (for example, available new data or data to be initially transmitted) that is not on the logical channel #1, the configured grant timer may be stopped or the running state of the configured grant timer may be ignored.

For another example, whether the configured grant timer can be stopped or whether the running state of the configured grant timer can be ignored is determined based on a priority of a logical channel.

In a possible implementation, a priority of a logical channel corresponding to the data #2 is higher than a priority of a logical channel corresponding to the data #1; or a preemption priority of a logical channel corresponding to the data #2 is higher than a preemption priority of a logical channel corresponding to the data #1; or a latency requirement of a logical channel corresponding to the data #2 is higher than a latency requirement of a logical channel corresponding to the data #1; or transmission reliability of a logical channel corresponding to the data #2 is higher than transmission reliability of a logical channel corresponding to the data #1. The priority of the logical channel may also represent a priority of a service carried on the logical channel.

It should be understood that in the method 2, only a plurality of possible implementations are listed as examples to determine whether the configured grant timer can be stopped or whether the running state of the configured grant timer can be ignored. This is not limited in this embodiment of this application. Any method for determining, by using a correspondence between a service or service data and a logical channel, or based on the priority of the logical channel, whether the configured grant timer can be stopped or whether the running state of the configured grant timer can be ignored falls within the protection scope of this embodiment of this application. For example, the network device directly indicates configuration information of a logical channel carrying data with a high priority. When data (for example, the data #1) that is being sent is deployed on the logical channel, the configured grant timer is stopped or the running state of the configured grant timer is ignored.

Method 3: Determine, based on an attribute parameter of a resource, whether the configured grant timer can be stopped or whether the running state of the configured grant timer can be ignored.

In a possible implementation, if PUSCH duration, a subcarrier spacing, a CP length, an MCS table, and the like that are used by the resource #1 of the scheduling grant of the current HARQ ID cannot meet the data #2 (for example, to-be-newly-transmitted data or available new data), it is determined to send a configured grant corresponding to the HARQ ID to the HARQ entity.

In another possible implementation, when the resource #1 cannot meet the data #2, the configured grant timer is stopped or the running state of the configured grant timer is ignored.

For example, if the maxPUSCH duration does not meet the data #2, that is, the maxPUSCH duration of the resource #1 is greater than the maxPUSCH duration of the resource #2, the configured grant timer may be stopped or the running state of the configured grant timer may be ignored. For another example, if the MCS does not meet the data #2, that is, the MCS of the resource #1 is greater than the MCS of the resource #2, it may also be understood as that the MCS table does not meet the data #2, that is, a block error ratio (BLER) of the MCS table used by the resource #1 is greater than a BLER of the MCS table used by the configured grant resource, the configured grant timer may be stopped or the running state of the configured grant timer may be ignored. For another example, if a logical channel mapped to a configured grant cannot be completely mapped to the resource #1, the configured grant timer may be stopped or the running state of the configured grant timer may be ignored.

It should be understood that in the method 3, only a plurality of possible implementations are listed as examples to determine whether the configured grant timer can be stopped or whether the running state of the configured grant timer can be ignored. This is not limited in this embodiment of this application. Any method for determining, by using information about the resource #1 and/or the resource #2, whether the configured grant timer can be stopped or whether the running state of the configured grant timer can be ignored falls within the protection scope of this embodiment of this application. For example, the foregoing plurality of possible implementations may be separately used or may be used in combination.

Based on the foregoing technical solution, when the terminal device is sending service data with a low priority, for example, eMBB data, by using a scheduled resource, if to-be-sent service data with a high priority, for example, URLLC data, appears, and a configured grant resource used to transmit the service data with the high priority and the scheduled resource correspond to a same HARQ process number, sending of the service data with the low priority may be stopped, and the service data with the high priority is sent by using the configured grant resource, so as to resolve a problem that the service data with the high priority can be sent by using the configured grant resource only after the service data with the low priority is sent. It is determined, by adding priority determining of a resource, processing a pre-configured grant timer (for example, ignoring or stopping a running state of the configured grant timer), and based on an attribute of a scheduled resource (for example, an example of the resource #1) and an attribute of a pre-configured resource (for example, an example of the resource #2), or based on an attribute of data sent by the scheduling resource, an attribute of data to be sent by the pre-configured resource, and the like, to use the pre-configured resource to perform new transmission, so that not only resource utilization of the configured grant resource can be improved, but also transmission performance of a service with a high priority can be improved.

Figure 6:
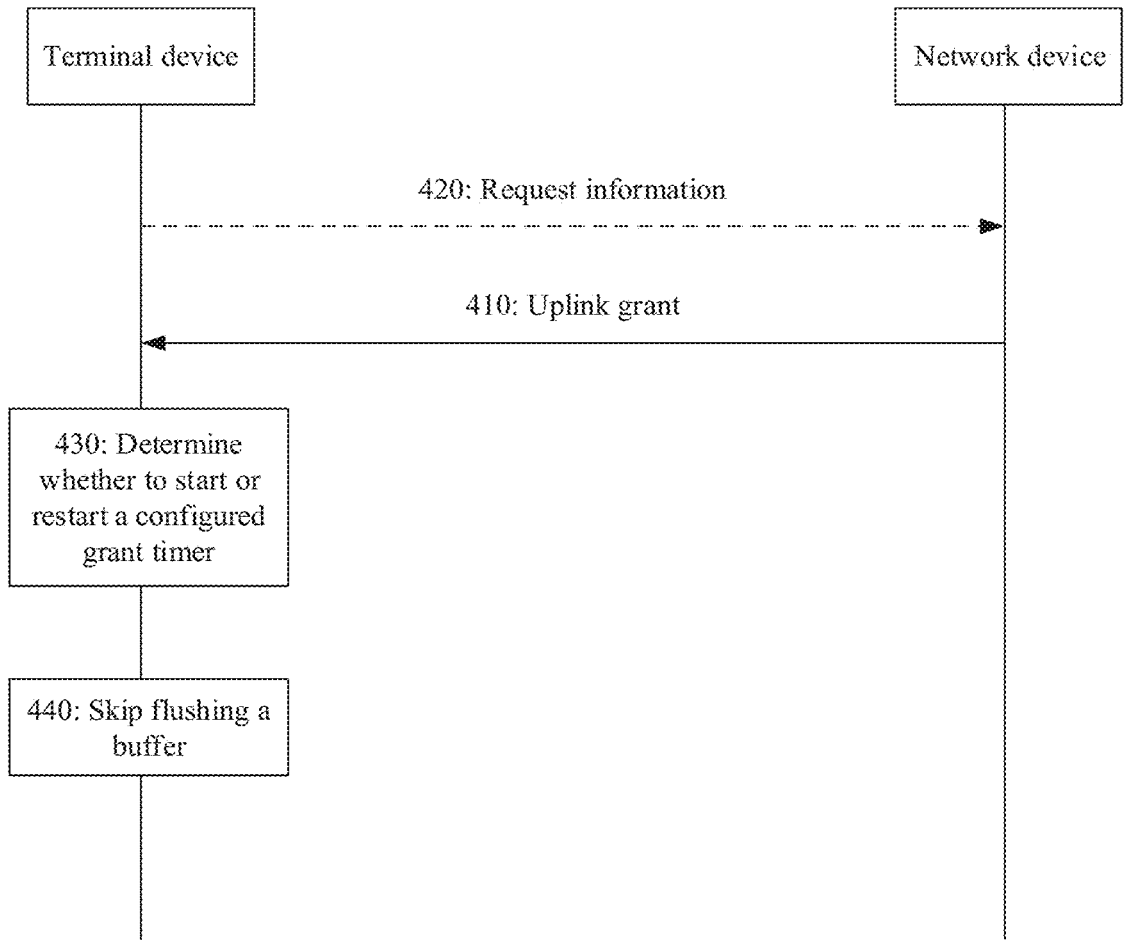
FIG. 6 is another schematic interaction diagram of a data sending method according to an embodiment of this application.

The following describes the second method in detail with reference to FIG. 6: delaying starting the configured grant timer.

FIG. 6 is a schematic flowchart of a data sending method 400 from a perspective of device interaction. As shown in the figure, the method 400 shown in FIG. 6 may include step 410 to step 440. The following describes the steps in the method 400 in detail with reference to FIG. 6.

In step 410, a network device sends an uplink grant (that is, an example of a resource #1) to a terminal device. Correspondingly, the terminal device receives the uplink grant sent by the network device.

Step 410 is similar to step 320 in the method 300. For brevity, details are not described herein again.

Optionally, before step 410, step 420 is included. In step 420, the terminal device sends request information to the network device, where the request information is used to request a resource used to transmit data. Correspondingly, the network device receives the request information sent by the terminal device, and allocates, to the terminal device based on the request information, the resource used to transmit data.

Step 420 is similar to step 330 in the method 300. For brevity, details are not described herein again.

In step 430, the terminal device determines whether to start or restart a configured grant timer.

There are many manners to determine whether to run the timer. For example, if PUSCH duration of the uplink grant resource is greater than a predefined threshold, a CP length is greater than a predefined threshold, or a subcarrier spacing is less than a predefined threshold, it is determined not to start the timer. The predefined threshold may be determined through network configuration, protocol agreement, or implementation inside the terminal device. This is not limited in this embodiment of this application. For example, if a logical channel to which data that may be sent by using the uplink grant resource belongs is a logical channel on which the network device notifies the terminal device to start the configured grant timer, when receiving the uplink grant, the terminal device starts the uplink grant and a configured grant timer corresponding to a HARQ process number. For example, if a logical channel to which data that may be sent by using the uplink grant resource belongs is a logical channel on which the network device notifies the terminal device not to start or to delay starting the configured grant timer, when receiving the uplink grant, the terminal device does not start or delays starting the uplink grant and a configured grant timer corresponding to a HARQ process number.

When a configured grant timer is not run, a configuration resource of a HARQ process corresponding to the configured grant timer is sent to a HARQ entity, that is, a configured grant of the HARQ process corresponding to the configured grant timer and information about the HARQ process are sent to the HARQ entity, where to-be-sent data in the HARQ process is data #1. The data #1 may be newly transmitted data, or may be retransmitted data. This is not limited.

When a configured grant timer is not run, the terminal device waits for whether to-be-sent data #2 (that is, to-be-initially-transmitted or newly-transmitted data #2) appears. When to-be-sent data #2 appears, the terminal device sends the data #2 by using a resource #2, and starts the configured grant timer. When to-be-sent data #2 does not appear, that is, when the HARQ entity does not obtain to-be-newly-transmitted data #2 used for the HARQ process, a buffer of the HARQ process is not flushed, or the configured grant timer corresponding to the HARQ process is started or resumed. In other words, when the terminal device receives a configured grant corresponding to the HARQ ID (that is, a HARQ ID of the resource #1) and does not obtain data that is on a logical channel specified by the network device, the terminal device does not flush the buffer. The terminal device sends the data #1 by using the resource #1. If a configured grant timer corresponding to a HARQ process of the resource #1 is not started, the configured grant timer is started. The data on the logical channel specified by the network device is data with a higher priority than the data #1 that is currently to be sent by the terminal device. The logical channel specified by the network device may be a logical channel received from the network device, and the specified logical channel has a logical channel identifier. The terminal device does not start the configured grant timer because the terminal device expects to wait for newly transmitted data on the logical channel.

Optionally, if the resource #1 is a dynamically scheduled resource, and the resource #1 and the configured grant are used for or correspond to a same HARQ process, it may be determined not to start or determined to delay starting the timer, or the timer is set to be in a suspended, paused, or start delay state.

Optionally, the terminal device may determine, based on any one of the method 1 to the method 3 mentioned in the method 300, whether to start or whether to delay starting the configured grant timer. For brevity, details are not described herein again.

FIG. 6 shows only a case in which the terminal device temporarily does not start the configured grant timer after receiving the resource #1. When the terminal device determines not to start the configured grant timer, the method 400 may further include step 440. In step 440, the terminal device does not flush a buffer. The following provides descriptions with reference to two scenarios.

Scenario 1:

The HARQ entity obtains a MAC PDU.

For example, if there is to-be-sent data #2, the terminal device sends the data #2 by using the resource #2, to form a MAC PDU, and submit the packet, information about the HARQ process, and the grant resource to the HARQ entity. The HARQ entity re-transmits the MAC PDU. In this case, the terminal device does not flush the buffer.

The MAC PDU may further include other information, for example, MAC layer control information. This is not limited in this embodiment of this application.

Scenario 2:

The HARQ entity does not obtain a MAC PDU. For example, the HARQ entity uses a configuration resource of the HARQ process to obtain a data packet of an expected logical channel, but fails to obtain the data packet of the expected logical channel. It is possible that there is no data to form a new MAC PDU, or that there is only data from an unexpected logical channel. In both cases, the configuration resource should not be used to form a new MAC PDU.

According to this embodiment of this application, delaying a running occasion of a configured grant timer may also be understood as not starting the configured grant timer temporarily. The HARQ entity does not obtain a MAC PDU. In this case, there is no to-be-sent data #2. Even if the HARQ entity does not obtain the MAC PDU, the terminal device does not flush the buffer. The terminal device may determine, based on any one of the following possible implementations, not to flush the buffer:

In a possible implementation, the terminal device records the status of the configured grant timer as a suspended, paused, or start delay state.

For example, an identifier field may be set to identify not to start or to delay starting the timer, or set the timer to be in a suspended state. After the terminal device receives the resource #1, a status of the configured grant timer corresponding to the HARQ process number of the resource #1 is a state in which the configured grant timer is not started and is suspended temporarily. In this case, the terminal device does not flush the buffer based on that the status of the configured grant timer is the suspended state. When one piece of expected to-be-sent data #2 is obtained, the terminal device sends the data #2 by using the resource #2, and starts the configured grant timer corresponding to the HARQ process number, where the status of the configured grant timer changes from the suspended state to the running state, and the terminal device sends the data #2 by using the resource #2. When there is no to-be-sent data #2, the status of the configured grant timer changes from the suspended state to the running state, and the terminal device sends the data #1 by using the resource #1.

In another possible implementation, the terminal device records that the configured grant timer is not started because the terminal device waits for whether data #2 is arrived.

For example, on a sending occasion of a configuration resource in which a HARQ process number corresponding to a resource of the data #1 is located, if data #2 with a higher priority than that of the data #1 needs to be sent, the data #2 is sent, and the configured grant timer is started. If no data with a higher priority than that of the data #1 needs to be sent, the buffer is not flushed, the configured grant timer is started, and the data #1 is sent by using the resource #1.

If the HARQ entity does not obtain a MAC PDU of an expected logical channel, the terminal device does not flush the buffer. For example, the terminal device waits for whether the data #2 is arrived. If there is to-be-newly-transmitted data #2, and the terminal device sends the data #2 by using the resource #2, the status of the configured grant timer changes from the suspended state to the running state. If there is no to-be-newly-transmitted data #2, and the terminal device sends the data #1 by using the resource #1, the status of the configured grant timer changes from the suspended state to the running state.

The foregoing describes, with reference to the scenario 1 and the scenario 2, that regardless of whether the HARQ entity obtains a newly transmitted MAC PDU of an expected logical channel, the terminal device does not flush the buffer. When the HARQ entity does not obtain the MAC PDU, the terminal device waits for whether there is data #2, and does not flush the buffer.

In this embodiment of this application, waiting for whether data #2 is arrived indicates waiting for whether there is data #2 needing to be sent, and the data #2 indicates data with a higher priority than that of the data #1.

Optionally, the network device may notify information about one or more logical channels (for example, notify an ID of the one or more logical channels), and notify the terminal device to wait for arrival of data on the one or more logical channels. The one or more logical channels carry data of a service with a relatively high priority or a service with a highest priority. When data on the one or more logical channels is arrived, the configured grant timer is started; otherwise, the configured grant timer is not started.

Optionally, the network device notifies the terminal device of the information about the one or more logical channels (for example, notifies the ID of the one or more logical channels). When the resource #1 is received, a HARQ ID of the resource #1 is the same as a HARQ ID of a configured grant resource, and when the data sent by the resource #1 is carried on the one or more logical channels, the configured grant timer is not started.

Based on the foregoing technical solution, when the terminal device receives a scheduling resource used to send the data #1, if a HARQ ID of the scheduling resource is shared with the HARQ ID of the configured grant resource, the terminal device delays starting the configured grant timer to wait for the data #2 (that is, data with a higher priority than that of the data #1). In this way, when the data #2 is arrived, the data #2 can be sent in time, and the data #2 can be sent by using the configured grant resource without waiting for completion of sending the data #1, thereby improving resource utilization of the configured grant resource. Especially, when the data #2 is latency-sensitive, transmission performance of the service data can be improved.

It should be understood that the data sending method provided in the embodiments of this application is described in detail above with reference to FIG. 4 to FIG. 6. It should be understood that, in this specification, only for ease of understanding, interaction between a terminal device and a network device is used as an example to describe in detail the method provided in the embodiments of this application. However, this shall not constitute any limitation on this application. Alternatively, the terminal device may send the data #1 to another device (for example, another network device or terminal device) when receiving a scheduled resource of the network device. This is not limited in the embodiments of this application.

It should be further understood that sequence numbers of the processes do not mean execution sequences in the embodiments of this application. The execution sequences of the processes should be determined based on functions and internal logic of the processes, and should not be construed as any limitation on the implementation processes of the embodiments of this application.

The data sending method provided in the embodiments of this application is described in detail with reference to FIG. 4 to FIG. 6. The following describes in detail apparatuses provided in the embodiments of this application with reference to FIG. 7 to FIG. 1.

An embodiment of this application further provides an apparatus configured to implement any one of the foregoing methods. For example, an apparatus is provided, including units (or means) configured to implement the steps performed by the terminal device in any one of the foregoing methods. For another example, another apparatus is further provided, including units (or means) configured to implement the steps performed by the network device in any one of the foregoing methods.

Figure 7:
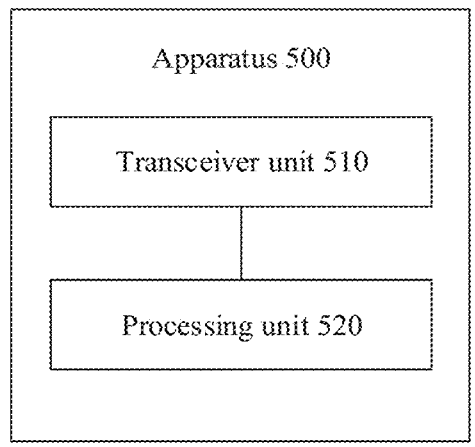
FIG. 7 is a schematic block diagram of an apparatus according to an embodiment of this application.

FIG. 7 is a schematic block diagram of an apparatus 500 according to an embodiment of this application. As shown in FIG. 7, the apparatus 500 may include a transceiver unit 510 and a processing unit 520.

In a possible design, the communications apparatus 500 may be the terminal device in the method 300 and the method 400, for example, may be a terminal device or a chip disposed in a terminal device.

In a possible implementation, the transceiver unit 510 is configured to receive a configuration message from a network device, where the configuration message is used to indicate a configured grant, and the configuration message includes information about a timer. The processing unit 520 is configured to: determine that the configured grant is used for a first HARQ process, and start the timer for the first HARQ process, where to-be-sent data in the first HARQ process is data on a first logical channel. The processing unit 520 is further configured to: during running of the timer, when there is to-be-newly-transmitted data on a second logical channel, stop the timer, or send the configured grant of the first HARQ process and information about the first HARQ process to a HARQ entity. The transceiver unit 510 is further configured to send the data on the second logical channel by using the configured grant.

Optionally, an attribute parameter of the first logical channel and an attribute parameter of the second logical channel meet a preset condition.

Optionally, that an attribute parameter of the first logical channel and an attribute parameter of the second logical channel meet a preset condition includes:
maximum physical uplink shared channel duration maxPUSCH-Duration of a first uplink grant resource of the first logical channel is greater than maxPUSCH-Duration of a second uplink grant resource of the second logical channel;
a subcarrier spacing of a first uplink grant resource of the first logical channel is less than a subcarrier spacing of a second uplink grant resource of the second logical channel;
a cyclic prefix CP length of a first uplink grant resource of the first logical channel is greater than a CP length of a second uplink grant resource of the second logical channel; or
a modulation and coding scheme MCS index value of a first uplink grant resource of the first logical channel is greater than an MCS index value of a second uplink grant resource of the second logical channel.

Optionally, a priority of the second logical channel is higher than a priority of the first logical channel; a preemption priority of the second logical channel is higher than a preemption priority of the first logical channel; a latency requirement of the second logical channel is higher than a latency requirement of the first logical channel; or transmission reliability of the second logical channel is higher than transmission reliability of the first logical channel.

Optionally, sending of the data on the first logical channel is allowed to be preempted.

Optionally, sending of the data on the second logical channel is allowed to be preempted.

Optionally, the processing unit 520 is further configured to flip a new data indicator NDI of the first HARQ process.

In another possible implementation, the transceiver unit 510 is configured to receive a configuration message from a network device, where the configuration message is used to configure a configuration grant for at least one HARQ process, and the configuration message includes information about a timer.

The processing unit 520 is configured to: when a timer corresponding to a first HARQ process in the at least one HARQ process is not run, send a configuration grant of the first HARQ process to a HARQ entity, where to-be-sent data in the first HARQ process is data on a first logical channel. The processing unit 520 is further configured to: when the HARQ entity does not obtain to-be-newly-transmitted data that is of a second logical channel and that is used for the first HARQ process, skip flushing a buffer of the first HARQ process, or start or resume the timer corresponding to the first HARQ process.

Optionally, the transceiver unit 510 is further configured to receive a first uplink grant, where the first uplink grant is used to send the data that is on the first logical channel. The processing unit 520 is configured to: when the first uplink grant and the configured grant correspond to the first HARQ process, determine not to start or determine to delay starting the timer, or set the timer to be in a suspended state.

Optionally, the processing unit 520 is further configured to set an identifier field, where the identifier field is used to identify not to start or identify to delay starting the timer, or set the timer to be in the suspended state.

Optionally, the processing unit 520 is specifically configured to: when the identifier field for delaying starting the timer is set or the timer is set to be in the suspended state, skip flushing the buffer of the first HARQ process.

Optionally, the processing unit 520 is specifically configured to: when the identifier field for delaying starting the timer is set or the timer is set to be in the suspended state, start or resume the timer corresponding to the first HARQ process.

Optionally, an attribute parameter of the first logical channel and an attribute parameter of the second logical channel meet a preset condition.

Optionally, that an attribute parameter of the first logical channel and an attribute parameter of the second logical channel meet a preset condition includes:
maximum physical uplink shared channel duration maxPUSCH-Duration of a first uplink grant resource of the first logical channel is greater than maxPUSCH-Duration of a second uplink grant resource of the second logical channel;

a subcarrier spacing of a first uplink grant resource of the first logical channel is less than a subcarrier spacing of a second uplink grant resource of the second logical channel;

a cyclic prefix CP length of a first uplink grant resource of the first logical channel is greater than a CP length of a second uplink grant resource of the second logical channel; or a modulation and coding scheme MCS index value of a first uplink grant resource of the first logical channel is greater than an MCS index value of a second uplink grant resource of the second logical channel.

Optionally, a priority of the second logical channel is higher than a priority of the first logical channel; a preemption priority of the second logical channel is higher than a preemption priority of the first logical channel; a latency requirement of the second logical channel is higher than a latency requirement of the first logical channel; or transmission reliability of the second logical channel is higher than transmission reliability of the first logical channel.

Optionally, sending of the data on the first logical channel is allowed to be preempted.

Optionally, sending of the data on the second logical channel is allowed to be preempted.

It should be understood that the apparatus 500 may correspond to the terminal device in the method 300 and the method 400 according to the embodiments of this application. The apparatus 500 may include units configured to perform the method performed by the terminal device in the method 200 in FIG. 4 and the method 400 in FIG. 6. In addition, the units in the apparatus 500 and the foregoing other operations and/or functions are respectively intended to implement corresponding procedures of the method 200 in FIG. 4 and the method 400 in FIG. 6. For a specific process of performing the foregoing corresponding steps by the units, refer to the foregoing descriptions with reference to the method embodiments in FIG. 4 to FIG. 6. For brevity, details are not described herein.

It should be further understood that when the apparatus 500 is a chip disposed in the terminal device, the transceiver unit 510 in the apparatus 500 may be an input/output interface.

In another possible design, the apparatus 500 may be the network device in the method 300 and the method 400, for example, may be a network device or a chip disposed in a network device.

Specifically, the apparatus 500 may correspond to the network device in the method 300 and the method 400 according to the embodiments of this application. The apparatus 500 may include units configured to perform the method performed by the network device in the method 200 in FIG. 4 and the method 400 in FIG. 6. In addition, the units in the apparatus 500 and the foregoing other operations and/or functions are respectively intended to implement corresponding procedures of the method 200 in FIG. 4 and the method 400 in FIG. 6.

It should be further understood that when the apparatus 500 is a chip disposed in a network device, the transceiver unit 510 in the apparatus 500 may be an input/output interface.

It should be understood that division of units in the apparatus is merely logical function division. During actual implementation, all or some of the units may be integrated into one physical entity or may be physically separated. In addition, all the units in the apparatus may be implemented by software invoked by a processing element, or may be implemented by hardware, or some units may be implemented by software invoked by a processing element, and some units are implemented by hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using an integrated logic circuit of hardware in the processor element, or may be implemented by software invoked by the processing element.

In an example, a unit in any one of the foregoing apparatuses may be one or more integrated circuits configured to implement the foregoing method, for example, one or more application-specific integrated circuits (ASIC), one or more microprocessors (DSP), or one or more field programmable gate arrays (FPGA), or a combination of at least two of these integrated circuit forms. For another example, when a unit in the apparatus is implemented in a form of a program scheduled by the processing element, the processing element may be a general purpose processor, for example, a central processing unit (CPU), or another processor that can invoke the program. For another example, the units may be integrated together and implemented in a form of a system-on-a-chip (SOC).

The foregoing receiving unit is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 8:
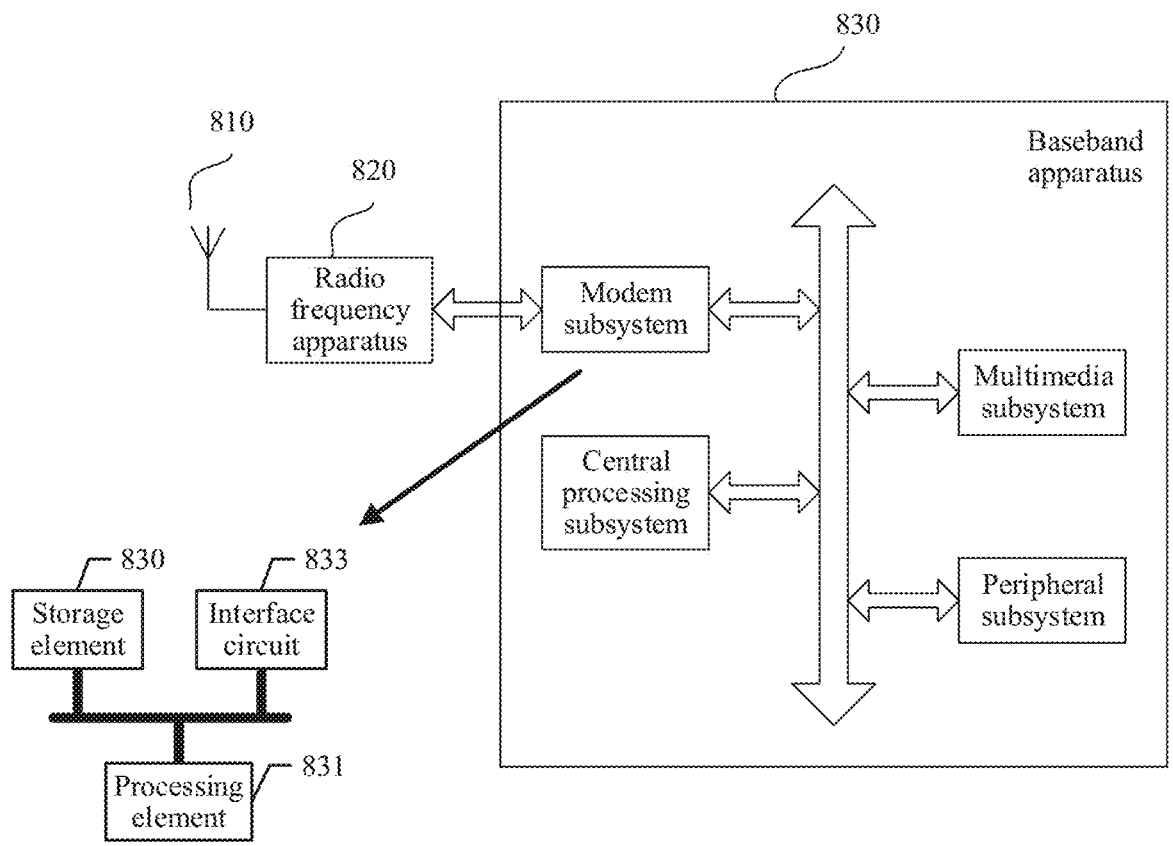
FIG. 8 is a schematic structural diagram of a terminal device according to an embodiment of this application.

FIG. 8 is a schematic structural diagram of a terminal device 800 according to an embodiment of this application. The terminal device 800 may be the terminal in the foregoing embodiments and is configured to implement operations of the terminal in the foregoing embodiments. As shown in FIG. 8, the terminal includes an antenna 810, a radio frequency part 820, and a signal processing part 830. The antenna 810 is connected to the radio frequency part 820. In a downlink direction, the radio frequency part 820 receives, through the antenna 810, information sent by a network device, and sends, to the signal processing part 830 for processing, the information sent by the network device. In an uplink direction, the signal processing part 830 processes information from the terminal, and sends the information to the radio frequency part 820. The radio frequency part 820 processes the information from the terminal, and then sends processed information to the network device through the antenna 810.

The signal processing part 830 may include a modem subsystem, configured to process data at each communications protocol layer. The signal processing part 830 may further include a central processing subsystem, configured to process an operating system and an application layer of the terminal. In addition, the signal processing part 830 may further include another subsystem, for example, a multimedia subsystem, or a peripheral subsystem. The multimedia subsystem is configured to control a camera or a screen display of the terminal. The peripheral subsystem is configured to connect to another device. The modem subsystem may be a separately disposed chip. Optionally, the foregoing apparatus used for the terminal may be located in the modem subsystem.

The modem subsystem may include one or more processing elements 831, for example, include a main control CPU and another integrated circuit. In addition, the modem subsystem may further include a storage element 832 and an interface circuit 833. The storage element 832 is configured to store data and a program. However, a program used to perform the methods performed by the terminal in the foregoing methods may not be stored in the storage element 832, but is stored in a memory outside the modem subsystem, and is loaded and used by the modem subsystem when to be used. The interface circuit 833 is configured to communicate with another subsystem. The foregoing apparatus used for the terminal may be located in the modem subsystem. The modem subsystem may be implemented by using a chip. The chip includes at least one processing element and an interface circuit. The processing element is configured to perform the steps in any one of the methods performed by the terminal. The interface circuit is configured to communicate with another apparatus. In an implementation, units of the terminal that implement the steps in the foregoing methods may be implemented by a program scheduled by a processing element. For example, the apparatus used for the terminal includes a processing element and a storage element. The processing element invokes a program stored in the storage element, to perform the methods performed by the terminal in the foregoing method embodiments. The storage element may be a storage element located on a same chip as the processing element, namely, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiments.

In still another implementation, units of the terminal that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. The integrated circuits may be integrated together to form a chip.

Units of the terminal that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by a program invoked by the processing element, and functions of some units are implemented by the integrated circuit.

It can be learned that the foregoing apparatus used for the terminal may include at least one processing element and interface circuit. The at least one processing element is configured to perform any one of the methods that are performed by the terminal and that are provided in the foregoing method embodiments. The processing element may perform some or all steps performed by the terminal in the foregoing method embodiments, in a first manner, to be specific, by invoking the program stored in the storage element; or may perform some or all steps performed by the terminal, in a second manner, to be specific, by using a hardware integrated logical circuit in the processing element in combination with an instruction; or may certainly perform, by combining the first manner and the second manner, some or all steps performed by the terminal.

As described above, the processing element herein may be a general purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms.

The storage element may be a memory, or may be a general name of a plurality of storage elements.

Figure 9:
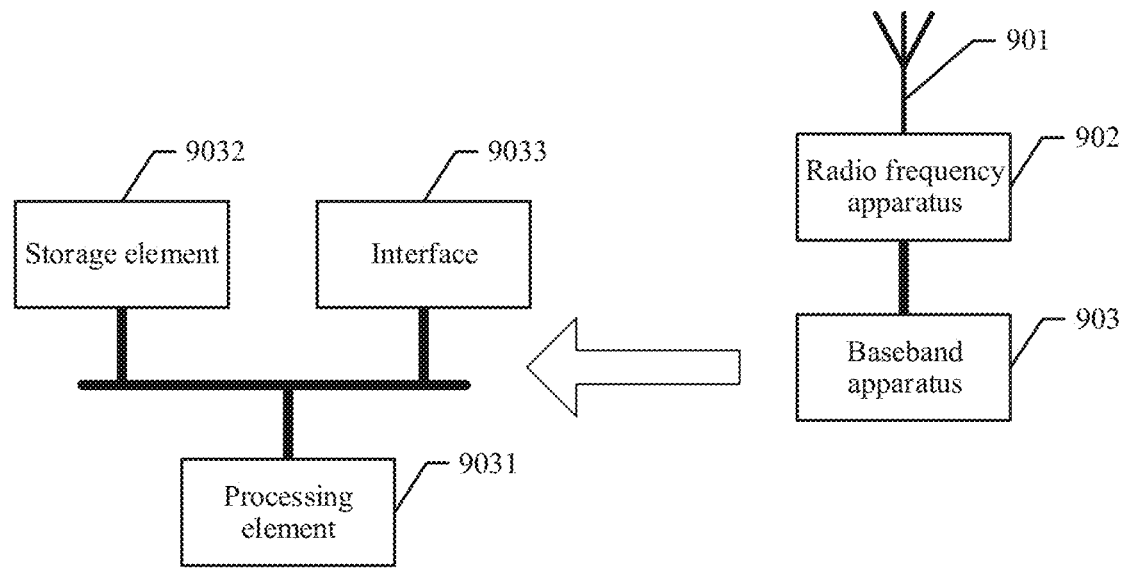
FIG. 9 is a schematic structural diagram of a network device according to an embodiment of this application.

FIG. 9 is a schematic structural diagram of a network device according to an embodiment of this application. The network device is configured to implement operations of the network device in the foregoing embodiments. As shown in FIG. 9, the network device includes an antenna 901, a radio frequency apparatus 902, and a baseband apparatus 903. The antenna 901 is connected to the radio frequency apparatus 902. In an uplink direction, the radio frequency apparatus 902 receives, through the antenna 901, information sent by a terminal, and sends, to the baseband apparatus 903 for processing, the information sent by the terminal. In a downlink direction, the baseband apparatus 903 processes the information from the terminal, and sends the information to the radio frequency apparatus 902. The radio frequency apparatus 902 processes the information from the terminal, and then sends processed information to the terminal by using the antenna 901.

The baseband apparatus 903 may include one or more processing elements 9031, for example, include a main control CPU and another integrated circuit. In addition, the baseband apparatus 903 may further include a storage element 9032 and an interface 9033. The storage element 9032 is configured to store a program and data. The interface 9033 is configured to exchange information with the radio frequency apparatus 902, and the interface is, for example, a common public radio interface (CPRI). The foregoing apparatus used for the network device may be located in the baseband apparatus 903. For example, the foregoing apparatus used for the network device may be a chip in the baseband apparatus 903. The chip includes at least one processing element and interface circuit. The processing element is configured to perform the steps of any one of the methods performed by the network device. The interface circuit is configured to communicate with another apparatus. In an implementation, units of the network device that implement the steps in the foregoing methods may be implemented by a program scheduled by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. The integrated circuits may be integrated together to form a chip.

Units of the network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units are implemented by the integrated circuit.

It can be learned that the foregoing apparatus used for the network device may include at least one processing element and interface circuit. The at least one processing element is configured to perform any one of the methods that are performed by the network device and that are provided in the foregoing method embodiments. The processing element may perform some or all steps performed by the network device, in a first manner, to be specific, by invoking the program stored in the storage element; or may perform some or all steps performed by the network device, in a second manner, to be specific, by using a hardware integrated logical circuit in the processing element in combination with an instruction; or may certainly perform, by combining the first manner and the second manner, some or all steps performed by the network device.

As described above, the processing element herein may be a general purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms.

The storage element may be a memory, or may be a general name of a plurality of storage elements.

Figure 10:
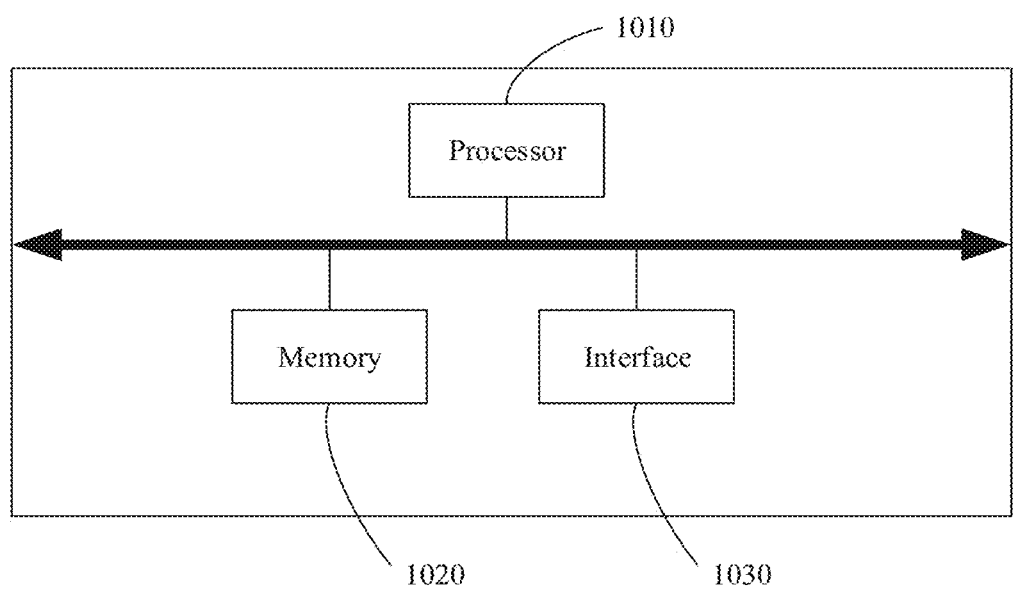
FIG. 10 is another schematic structural diagram of a network device according to an embodiment of this application.

FIG. 10 is a schematic structural diagram of a network device according to an embodiment of this application. FIG. 10 is a schematic structural diagram of another network device according to an embodiment of this application.

As shown in FIG. 10, the network device includes a processor 1010, a memory 1020, and an interface 1030. The processor 1010, the memory 1020, and the interface 1030 are signal-connected.

The foregoing apparatus is located in the network device, and functions of the units may be implemented by the processor 1010 by invoking a program stored in the memory 1020. That is, the foregoing apparatus includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

An embodiment of this application further provides a processing apparatus, including a processor and an interface. The processor is configured to perform the communication method in the foregoing method embodiments.

It should be understood that, the processing apparatus may be a chip. For example, the processing apparatus may be a field programmable gate array (FPGA), an application-specific integrated circuit (ASIC), a system-on-a-chip (SoC), a central processing unit (CPU), a network processor (NP), a digital signal processing circuit (DSP), a micro controller unit (MCU), a programmable logic device (PLD), or another integrated chip.

In an implementation process, steps in the foregoing method may be implemented by using a hardware integrated logic circuit in the processor or an instruction in a form of software. The steps of the methods disclosed with reference to the embodiments of this application may be directly presented as being performed and completed by a hardware processor, or performed and completed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor. To avoid repetition, details are not described herein again.

It should be noted that the processor in this embodiment of this application may be an integrated circuit chip and has a signal processing capability. In an implementation process, steps in the foregoing method embodiments may be implemented by using a hardware integrated logic circuit in the processor or an instruction in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in the embodiments of this application may be implemented or performed. The general purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that, in the embodiments of this application, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that memories in the system and method described in this specification include but are not limited to the memories and memories of any other proper types.

According to the method provided in the embodiments of this application, this application further provides a computer program product. The computer program product includes computer program code. When the computer program code is run on a computer, the computer is enabled to perform the method in any one of the embodiments shown in FIG. 4 to FIG. 6.

According to the method provided in the embodiments of this application, this application further provides a computer-readable medium. The computer-readable medium stores program code. When the program code is run on a computer, the computer is enabled to perform the method in any one of the embodiments shown in FIG. 4 to FIG. 6.

According to the method provided in the embodiments of this application, this application further provides a system, including the foregoing one or more terminal devices and one or more network devices.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

The network device and the terminal device in the foregoing apparatus embodiments exactly correspond to the network device and the terminal device in the method embodiments. A corresponding module or unit performs a corresponding step. For example, a communications unit (a transceiver) performs a receiving step or a sending step in the method embodiments, and a processing unit (a processor) may perform another step other than the sending step and the receiving step. For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, a configuration message from a network device, wherein the configuration message indicates a configured grant, and the configuration message comprises information about a timer;
   determining, by the terminal device, that the configured grant is configured for data transmissions of a first hybrid automatic repeat request (HARQ) process, and starting the timer for the first HARQ process when a data transmission is performed in the first HARQ process on a first logical channel;
   during running of the timer, when there is new data on a second logical channel to be sent in the first HARQ process, stopping the timer by the terminal device, or sending, by the terminal device, the configured grant of the first HARQ process and information about the first HARQ process to a HARQ entity for transmission of the new data on the second logical channel in the HARQ process; and
   sending, by the terminal device, the new data that is on the second logical channel using the configured grant.

2. The method according to claim 1, wherein an attribute parameter of the first logical channel and an attribute parameter of the second logical channel meet a preset condition.

3. The method according to claim 2, wherein that the attribute parameter of the first logical channel and the attribute parameter of the second logical channel meet the preset condition comprises:
   maximum physical uplink shared channel duration (max-PUSCH-Duration) of a first uplink grant resource of the first logical channel is greater than maxPUSCH-Duration of a second uplink grant resource of the second logical channel;
   a subcarrier spacing of a first uplink grant resource of the first logical channel is less than a subcarrier spacing of a second uplink grant resource of the second logical channel;
   a cyclic prefix (CP) length of a first uplink grant resource of the first logical channel is greater than a CP length of a second uplink grant resource of the second logical channel; or
   a modulation and coding scheme (MCS) index value of a first uplink grant resource of the first logical channel is greater than an MCS index value of a second uplink grant resource of the second logical channel.

4. The method according to claim 1, wherein
   a priority of the second logical channel is higher than a priority of the first logical channel;
   a preemption priority of the second logical channel is higher than a preemption priority of the first logical channel;
   a latency requirement of the second logical channel is higher than a latency requirement of the first logical channel; or
   transmission reliability of the second logical channel is higher than transmission reliability of the first logical channel.

5. The method according to claim 1, wherein
   sending of data on the first logical channel is preemptable.

6. The method according to claim 1, wherein
   sending of data on the second logical channel is preemptable.

7. The method according to claim 1, wherein sending the configured grant of the first HARQ process and the information about the first HARQ process to the HARQ entity comprises:
   flipping, by the terminal device, a new data indicator (NDI) of the first HARQ process.

8. An apparatus, comprising:
   a processor; and
   a non-transitory computer-readable storage medium coupled to the processor and storing programming instructions, and the programming instructions, when executed by the processor, causing the apparatus to:
   receive a configuration message from a network device, wherein the configuration message indicates a configured grant, and the configuration message comprises information about a timer;
   determine that the configured grant is configured for data transmissions of a first hybrid automatic repeat request (HARQ) process, and start the timer for the first HARQ process when a data transmission is performed in the first HARQ process on a first logical channel;
   during running of the timer, when there is new data on a second logical channel to be sent in the HARQ process, stop the timer, or send the configured grant of the first HARQ process and information about the first HARQ process to a HARQ entity for transmission of the new data on the second logical channel in the HARQ process; and
   send the new data that is on the second logical channel using the configured grant.

9. The apparatus according to claim 8, wherein an attribute parameter of the first logical channel and an attribute parameter of the second logical channel meet a preset condition.

10. The apparatus according to claim 9, wherein that the attribute parameter of the first logical channel and an attribute parameter of the second logical channel meet the preset condition comprises:
  maximum physical uplink shared channel duration (max-PUSCH-Duration) of a first uplink grant resource of the first logical channel is greater than maxPUSCH-Duration of a second uplink grant resource of the second logical channel;
  a subcarrier spacing of a first uplink grant resource of the first logical channel is less than a subcarrier spacing of a second uplink grant resource of the second logical channel;
  a cyclic prefix (CP) length of a first uplink grant resource of the first logical channel is greater than a CP length of a second uplink grant resource of the second logical channel; or
  a modulation and coding scheme (MCS) index value of a first uplink grant resource of the first logical channel is greater than an MCS index value of a second uplink grant resource of the second logical channel.

11. The apparatus according to claim 8, wherein
  a priority of the second logical channel is higher than a priority of the first logical channel;
  a preemption priority of the second logical channel is higher than a preemption priority of the first logical channel;
  a latency requirement of the second logical channel is higher than a latency requirement of the first logical channel; or
  transmission reliability of the second logical channel is higher than transmission reliability of the first logical channel.

12. The apparatus according to claim 8, wherein sending of data on the first logical channel is preemptable.

13. The apparatus according to claim 8, wherein sending of data on the second logical channel is preemptable.

14. The apparatus according to claim 8, wherein sending the configured grant of the first HARQ process and the information about the first HARQ process to the HARQ entity comprises:
  flip a new data indicator (NDI) of the first HARQ process.

15. A non-transitory computer readable storage medium storing a program that is executable by at least one processor, the program including instructions for:
  receiving a configuration message from a network device, wherein the configuration message indicates a configured grant, and the configuration message comprises information about a timer;
  determining that the configured grant is configured for data transmissions of a first hybrid automatic repeat request (HARQ) process, and start the timer for the first HARQ process when a data transmission is performed in the first HARQ process on a first logical channel;
  during running of the timer, when there is new data on a second logical channel to be sent in the HARQ process, stopping the timer, or sending the configured grant of the first HARQ process and information about the first HARQ process to a HARQ entity for transmission of the new data on the second logical channel in the HARQ process; and
  sending the new data that is on the second logical channel using the configured grant.

16. The non-transitory computer readable storage medium according to claim 15, wherein an attribute parameter of the first logical channel and an attribute parameter of the second logical channel meet a preset condition.

17. The non-transitory computer readable storage medium according to claim 16, wherein that the attribute parameter of the first logical channel and an attribute parameter of the second logical channel meet the preset condition comprises:
  maximum physical uplink shared channel duration (max-PUSCH-Duration) of a first uplink grant resource of the first logical channel is greater than maxPUSCH-Duration of a second uplink grant resource of the second logical channel;
  a subcarrier spacing of a first uplink grant resource of the first logical channel is less than a subcarrier spacing of a second uplink grant resource of the second logical channel;
  a cyclic prefix (CP) length of a first uplink grant resource of the first logical channel is greater than a CP length of a second uplink grant resource of the second logical channel; or
  a modulation and coding scheme (MCS) index value of a first uplink grant resource of the first logical channel is greater than an MCS index value of a second uplink grant resource of the second logical channel.

18. The non-transitory computer readable storage medium according to claim 15, wherein
  a priority of the second logical channel is higher than a priority of the first logical channel;
  a preemption priority of the second logical channel is higher than a preemption priority of the first logical channel;
  a latency requirement of the second logical channel is higher than a latency requirement of the first logical channel; or
  transmission reliability of the second logical channel is higher than transmission reliability of the first logical channel.

19. The non-transitory computer readable storage medium according to claim 15, wherein
  sending of data on the first logical channel is preemptable.

20. The non-transitory computer readable storage medium according to claim 15, wherein
  sending of data on the second logical channel is preemptable.

* * * * *